US012657041B2

(12) United States Patent
Lu et al.

(10) Patent No.: US 12,657,041 B2
(45) Date of Patent: Jun. 16, 2026

(54) SAVING AND SHARING PROMPTS FOR GENERATING ARTIFICIAL INTELLIGENCE (AI) CONTENT IN A WORKSPACE

(71) Applicant: Notion Labs, Inc., San Francisco, CA (US)

(72) Inventors: He Lu, San Francisco, CA (US); Jordan Scales, San Francisco, CA (US); Atul Varma, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 95 days.

(21) Appl. No.: 18/408,449

(22) Filed: Jan. 9, 2024

(65) Prior Publication Data

US 2025/0139580 A1 May 1, 2025

Related U.S. Application Data

(60) Provisional application No. 63/594,524, filed on Oct. 31, 2023.

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06F 16/955* (2019.01); *G06F 40/40* (2020.01);
(Continued)

(58) Field of Classification Search
CPC ....... G06Q 10/101; G06Q 10/103; G06N 3/04
(Continued)

(56) References Cited

U.S. PATENT DOCUMENTS 10,505,825 B1 * 12/2019 Bettaiah ............ G06F 16/24578
11,907,674 B1 2/2024 Akerlund et al.
(Continued)

OTHER PUBLICATIONS

I. Horváth and Á. B. Csapó, "Structured Template Language and Generative AI Driven Content Management for Personalized Workspace Reconfiguration," 2023 IEEE 2nd International Conference on Cognitive Aspects of Virtual Reality (CVR), Veszprém, Hungary, 2023, pp. 000017-000022 (Year: 2023).*
(Continued)

*Primary Examiner* — Dione N. Simpson
(74) *Attorney, Agent, or Firm* — Perkins Coie LLP; Alberto Araiza; Anni Siitonen

(57) ABSTRACT

A method for saving prompts on a page of a workspace includes receiving a first input that instantiates a prompt block configured to initiate a generative process to create in-block content. The prompt block is embedded on a first page of a workspace configured to include multiple pages. The first input includes a string of text. The string of text includes instructions that cause a generative artificial intelligence (AI) system to create the in-block content to be displayed on the page. The method includes receiving a second input on the prompt block. In response to the second input, the method includes saving the string of text as a particular prompt. The particular prompt is accessible from the multiple pages of the workspace and the particular prompt is configured to be shared with users of the workspace.

19 Claims, 31 Drawing Sheets

(51) Int. Cl.

| | | |
|---|---|---|
| *G06F 16/955* | (2019.01) | |
| *G06F 40/40* | (2020.01) | |
| *G06N 3/04* | (2023.01) | |
| *G06Q 10/10* | (2023.01) | |
| *G06Q 10/101* | (2023.01) | |

(52) U.S. Cl.
CPC ............. *G06N 3/04* (2013.01); *G06Q 10/101* (2013.01); *G06Q 10/103* (2013.01)

(58) Field of Classification Search
USPC .......................................................... 705/301
See application file for complete search history.

(56) References Cited

U.S. PATENT DOCUMENTS

| | | | | |
|---|---|---|---|---|
| 2020/0218519 | A1 | 7/2020 | Brebner | |
| 2021/0357542 | A1* | 11/2021 | Bowen | G06Q 30/0621 |
| 2023/0169967 | A1 | 6/2023 | Cronin et al. | |
| 2023/0315970 | A1 | 10/2023 | Monroe | |
| 2024/0020538 | A1 | 1/2024 | Socher et al. | |
| 2024/0045780 | A1 | 2/2024 | Aziz et al. | |
| 2024/0053996 | A1 | 2/2024 | Nachreiner | |
| 2024/0086648 | A1 | 3/2024 | Han et al. | |
| 2025/0110975 | A1* | 4/2025 | Shea | G06F 16/3329 |

OTHER PUBLICATIONS

Brie et al., "Evaluating a Large Language Model on Searching for GUI Layouts," Proceedings of the ACM on Human-Computer Interaction, vol. 7, No. 178, Jun. 2023, pp. 1-37.

ISA, International Search Report for International Application No. PCT/US24/38250, mailed on Nov. 21, 2024, 5 pages.

* cited by examiner

Receive input that actuates control of block
402

Determine selection of in-page content
404

Cause generative artificial intelligence (AI) system to create
generative content of particular type
406

Modify size of block area to contain the generative content as
generative in-block content
408

Populate modified block area to present the generative in-block
content
410

700

722

702

718

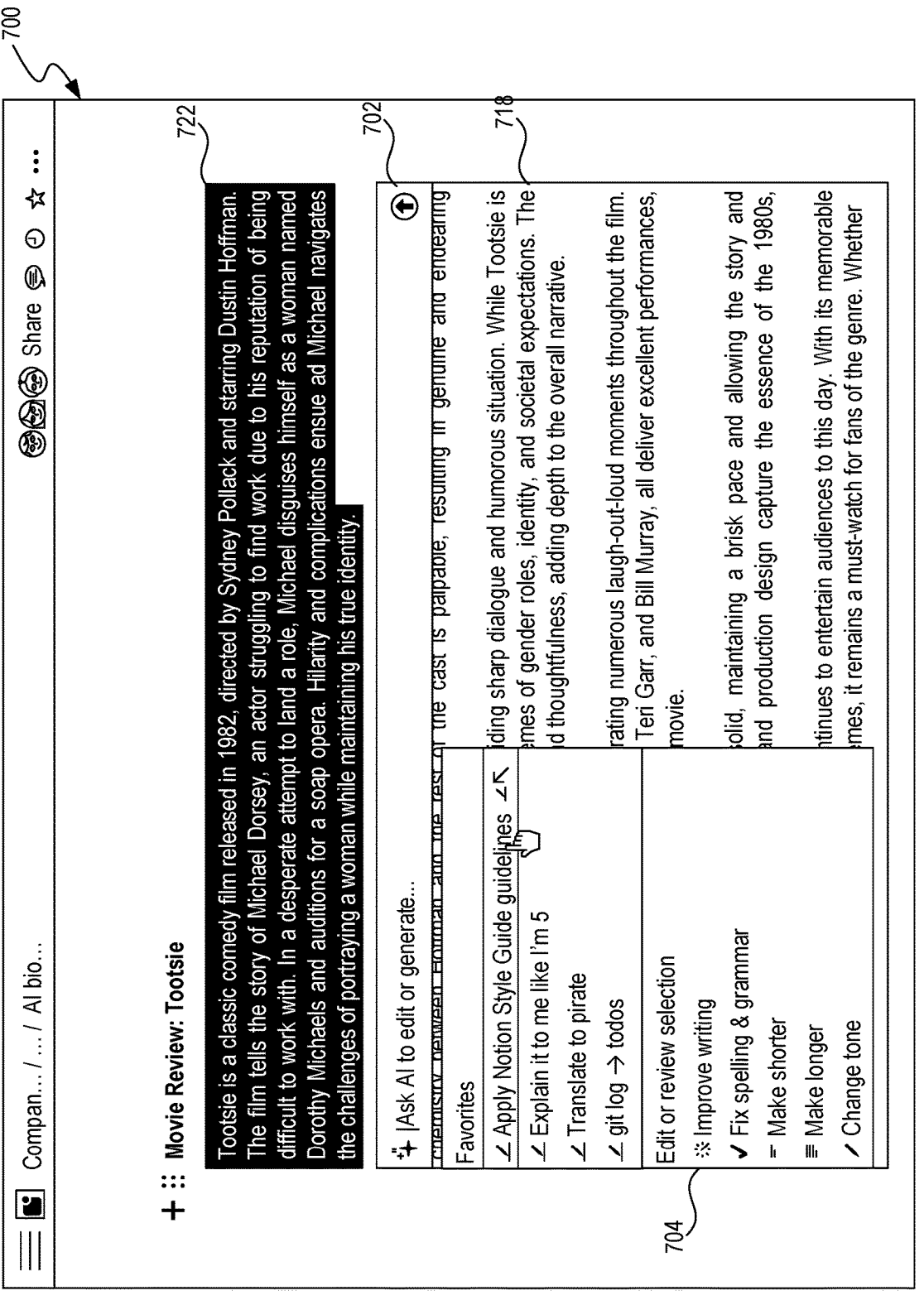

≡  ⊡  | Compan... / ... / AI bio...    ⊛⊛⊛ Share ⊜ ☉ ☆ •••

+  ⋮⋮  Movie Review: Tootsie

Tootsie is a classic comedy film released in 1982, directed by Sydney Pollack and starring Dustin Hoffman. The film tells the story of Michael Dorsey, an actor struggling to find work due to his reputation of being difficult to work with. In a desperate attempt to land a role, Michael disguises himself as a woman named Dorothy Michaels and auditions for a soap opera. Hilarity and complications ensue ad Michael navigates the challenges of portraying a woman while maintaining his true identity.

chemistry between Hoffman and the rest of the cast is palpable, resulting in genuine and endearing ⁺ |Ask AI to edit or generate...

Favorites

∠  Apply Notion Style Guide guidelines  ⤡

∠  Explain it to me like I'm 5

∠  Translate to pirate

∠  git log → todos

Edit or review selection

⁘  Improve writing

✔  Fix spelling & grammar

=  Make shorter

☰  Make longer

✎  Change tone

704

⊕

...ding sharp dialogue and humorous situation. While Tootsie is

...mes of gender roles, identity, and societal expectations. The

...d thoughtfulness, adding depth to the overall narrative.

...rating numerous laugh-out-loud moments throughout the film.

Teri Garr, and Bill Murray, all deliver excellent performances, movie.

...olid, maintaining a brisk pace and allowing the story and and production design capture the essence of the 1980s, ...ntinues to entertain audiences to this day. With its memorable ...mes, it remains a must-watch for fans of the genre. Whether

Receive input at particular position on page of workspace
802

Display prompt block configured to initiate generative process to create in-block content
804

Cause LLM system to create set of suggested prompts
806

Display the set of suggested prompts as set of control items of the workspace
808

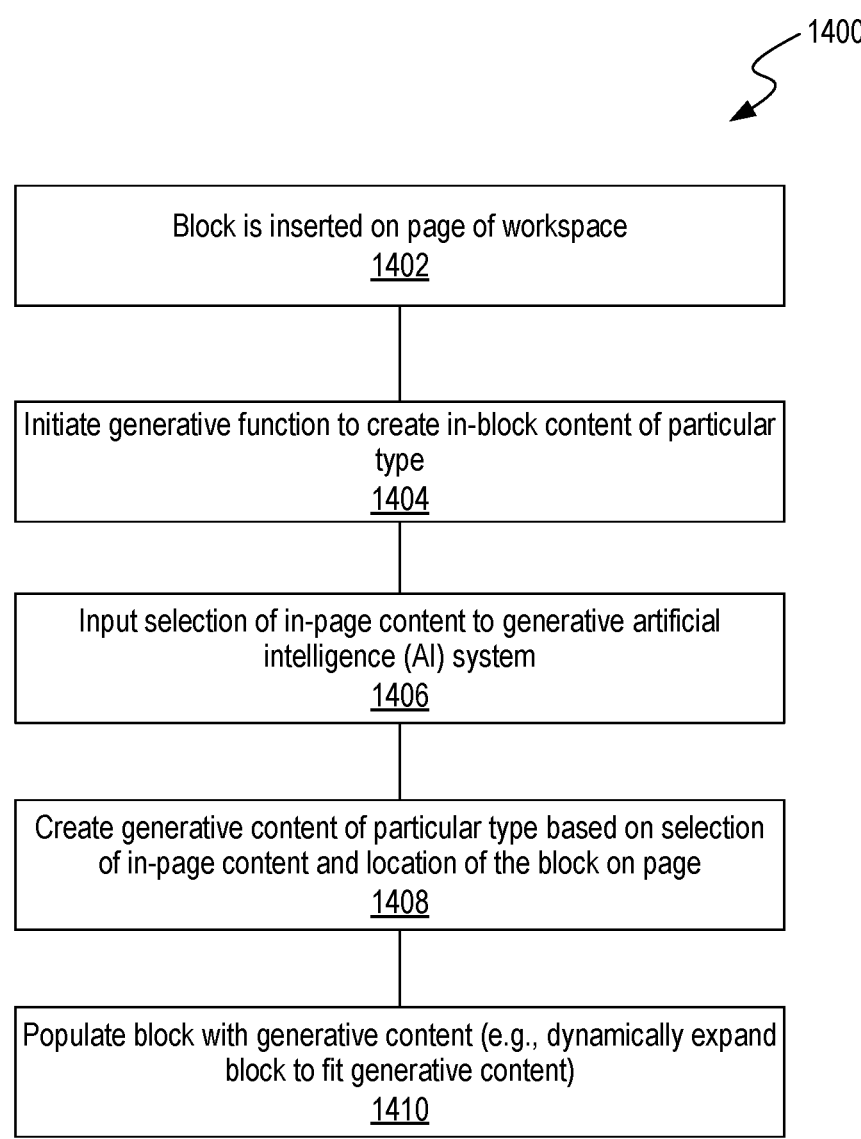

1400

Block is inserted on page of workspace
1402

Initiate generative function to create in-block content of particular type
1404

Input selection of in-page content to generative artificial intelligence (AI) system
1406

Create generative content of particular type based on selection of in-page content and location of the block on page
1408

Populate block with generative content (e.g., dynamically expand block to fit generative content)
1410

*FIG. 14*

SAVING AND SHARING PROMPTS FOR GENERATING ARTIFICIAL INTELLIGENCE (AI) CONTENT IN A WORKSPACE

CROSS-REFERENCE TO RELATED APPLICATIONS

This application claims priority to and benefit from U.S. Provisional Patent Application No. 63/594,524, entitled "INTEGRATED WORKSPACE THAT INCORPORATES GENERATIVE ARTIFICIAL INTELLIGENCE (AI) AND PROMPTS FUNCTIONALITY," filed on Oct. 31, 2023, which is hereby incorporated by reference in its entirety.

BACKGROUND

Workspaces (e.g., digital workspaces) refer to environments that assemble tools and platforms that allow users to work, communicate, and produce work products together. Workspaces can be desktop or web-based applications that allow multiple users to share and access the workspaces in a variety of manners. Workspaces can include compilations of electronic documents that can be organized within the workspace.

BRIEF DESCRIPTION OF THE DRAWINGS

Reference will now be made, by way of example, to the accompanying drawings, which show example embodiments of the present application and in which:

FIGS. 7A through 7C are exemplary views of a workspace page for suggesting prompts.

FIG. 14 is a flow diagram illustrating processes of an integrated workspace including the described AI and prompts functionality.

Figure 1:
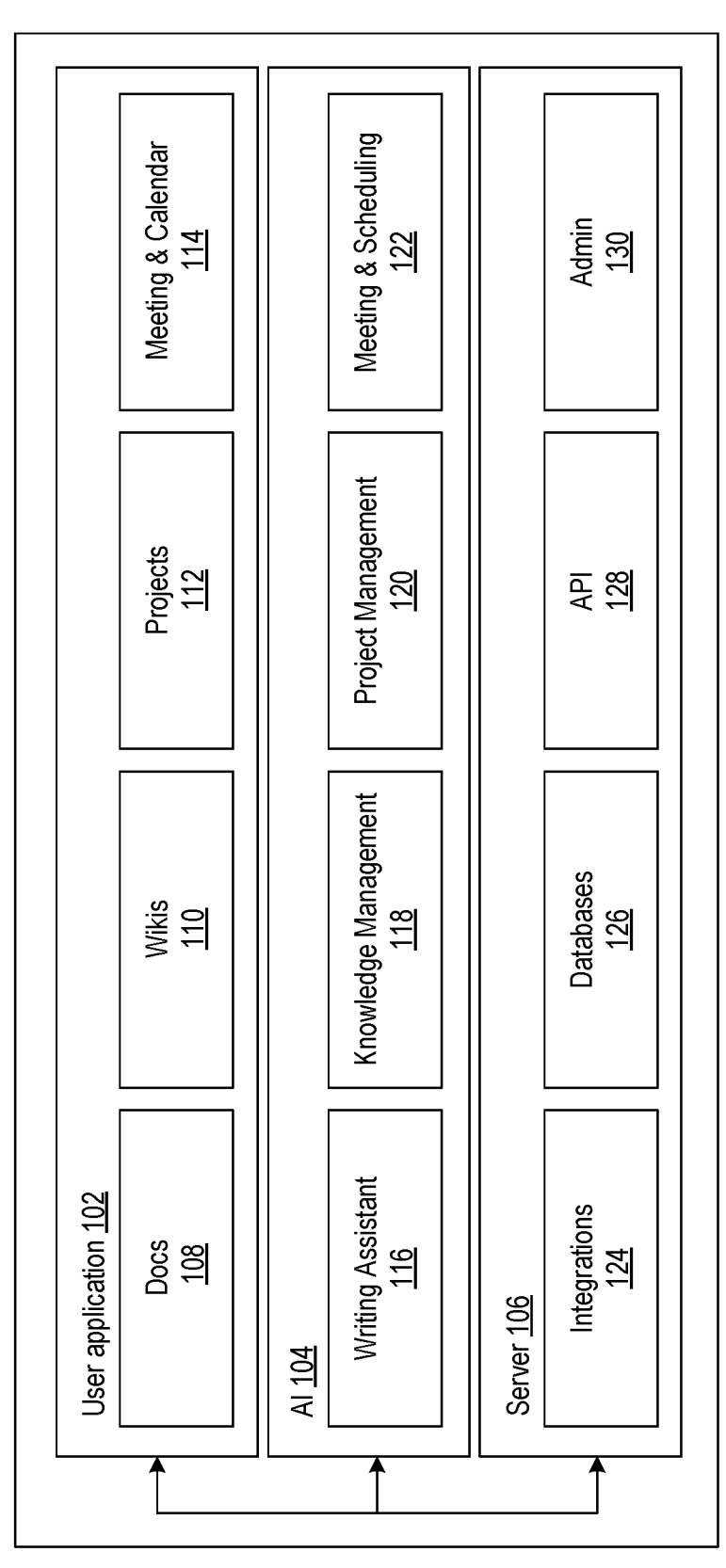
FIG. 1 is a block diagram illustrating a platform that may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides methods and devices for enhanced workspace user experiences. An aspect of the technology provides a user with an in-page object (also referred to as "a block" or "a content container") for creating content (e.g., text) on a workspace page. The content can be generated by an artificial intelligence (AI) system (e.g., a generative AI system including a large language model (LLM)) in accordance with a particular type of content associated with a block. The particular type of content can be, for example, a summary or a list of action items. The content is generated based on content that is included on the workspace page on which the block is located or based on content from an external source (e.g., accessed via a Uniform Resource Locator (URL) link displayed on the page). The generated content is then displayed on the workspace page.

The present technology can enable an easy and efficient manner of generating content, such as summaries, lists, or action items based on content already existing on a workspace page. As an example, a user can work on a page within a workspace that includes text content confined in content blocks. The text can include meeting notes that identify project goals, deadlines, background information, etc., discussed during a meeting. The user can then provide an input (e.g., a user input) on a location on the page to initiate the creation of generative content based on the meeting notes. The user can, for example, initiate the creation of a list of action items generated based on the meeting notes. In response to the user input, a list of action items generated by an AI system is displayed at the location on the page.

In one example, a method for creating in-block content presented in a block on a page of a workspace includes receiving an input that actuates a control of the block. The block is configured to initiate a generative process to create in-block content of a particular type. The block can be embedded as an in-page object on the page of the workspace and have dimensions that define a block area occupying a corresponding page area on the page of the workspace. In response to the input, the described methods include determining a selection of in-page content based on the location of the block relative to the in-page content and the particular type of in-block content. The in-page content can be presented on the page of the workspace and located outside of the block area. A method can include causing a generative AI system to create generative content of the particular type based on input including the selection of the in-page content. The method can also include modifying a size of the block area to contain the generative content as generative in-block content. The size of the block area can be automatically constrained to fit the generative in-block content and dynamically change as content is generated. The method can further include populating the modified block area to present the generative in-block content. The generative in-block content can replace, change, or augment other in-block content in response to a command to regenerate content. For example, in response to selected in-page content changing or in response to an actuation of a control that causes regeneration of in-block content.

In another example, an electronic device for creating in-container content presented in a container on a page of a workspace can receive an input that actuates a control of the container. The container can be configured to initiate a generative process to create in-container content of a particular type. The container can be embedded as an in-page object on the page of the workspace. In response to the input, the device can determine a selection of in-page content based on the location of the container relative to the in-page content. The in-page content can be located outside of an area of the container. The device can cause a generative AI system to create generative content of the particular type based on input including the selection of the in-page content. The device can modify a size of the container area to include the generative content as generative in-container content and populate the modified container area to present the generative in-container content.

In yet another example, a method for creating in-block content presented in a block on a page of a workspace includes receiving an input that actuates a control of the block. The block can be configured to initiate a generative process that creates in-block content of a particular type. The block can be embedded as an in-page object on the page of the workspace and has dimensions that define a block area occupying a corresponding page area on the page of the workspace. In response to the input, the method can determine a selection of in-page content based on the location of the block relative to the in-page content and the particular type of in-block content. The method can include accessing additional content that is different from the in-page content and causing a generative AI system to create generative content of the particular type based on input including the selection of the in-page content and the accessed additional content. The method can include modifying a size of the block area to contain the generative content as generative in-block content. The size of the block area is constrained to fit the generative in-block content. The method can further include populating the modified block area to present the generative in-block content.

Another aspect of the present technology also provides methods and devices for saving prompts and sharing prompts. A prompt refers to an input or an instruction provided by a user or machine to an AI system that can cause the AI system to generate content. The prompt thereby can provide a means for a user or machine to interact with the AI system. The prompt can include text (i.e., natural language text) such as a question or a command. In some implementations, prompts include a combination of instructions that cause the AI system to generate responses with more complexity. Such prompts can become lengthy. In such instances, a user may wish to be able to save the prompts and/or share such prompts with other users of a workspace, a particular group of users, or a community of users.

The present technology can enable a user to save prompts so that such prompts can be used on different pages of the associated workspace. The saved prompts can be named based on a suggested name generated by the AI system. For example, the AI system generates a name for a respective prompt based on the text included in the prompt. The name is descriptive of the generative content that the AI system can create based on the respective prompt. The technology can also enable the saved prompts to be shared within the workspace or outside the workspace (e.g., as URL links).

In one example, a method for saving prompts on a page of a workspace can include receiving a first input that instantiates a prompt block configured to initiate a generative process to create in-block content. The prompt block can be embedded on a first page of a workspace configured to include multiple pages. The first input can include a string of text. The string of text can include instructions that cause an AI system (e.g., an LLM system) to create the in-block content to be displayed on the page. The method can also include receiving a second input on the prompt block. In response to the second input, the method can include causing the generative AI system to create a name that is descriptive of the instructions based on the string of text and save the string of text and the name descriptive of the string of text as a prompt. The saved prompt can be identifiable based on the name descriptive of the string of text and be accessible from the multiple pages of the workspace. A generative process to create in-block content based on the saved prompt can be configured to be initiated on a respective page of the multiple pages of the workspace by a user input on the respective page.

In another example, an electronic device for operating a workspace can receive a first input that instantiates a prompt block configured to initiate a generative process to create in-block content. The prompt block can be embedded on a first page of a workspace configured to include multiple pages. The first input can include a string of text. The string of text can include instructions that cause an AI system to create the in-block content to be displayed on the page. The device can receive a second input on the prompt block. In response to a second input, the device can cause the generative AI system to create a name that is descriptive of the instructions based on the string of text. The device can save the string of text and the name descriptive of the string of text as a particular prompt. The particular prompt can be identifiable based on the name descriptive of the string of text and be accessible from the multiple pages of the workspace. A generative process to create in-block content based on the particular prompt can be configured to be initiated on a respective page of the multiple pages of the workspace by a user input on the respective page.

In yet another example, a method for saving prompts on a page of a workspace can include receiving a first input that instantiates a prompt block configured to initiate a generative process to create in-block content. The prompt block can be embedded on a first page of a workspace configured to include multiple pages. In one example, the first input includes a string of text. The string of text can include instructions that cause an AI system to create the in-block content to be displayed on the page. A method can include receiving a second input on the prompt block. In response to a second input, the method can include saving the string of text as a prompt. The particular prompt can be accessible from the multiple pages of the workspace. The particular prompt can be configured to be shared with users of the workspace.

Another aspect of the present technology provides methods and devices for suggesting prompts on a page of a workspace. Such suggested prompts can increase the efficiency of creating AI-generated content as well as the diversity of the generated content. In particular, a user who is unfamiliar with AI-powered workspaces may find it helpful to receive suggested prompts that allow a user to get started with the AI system to generate content.

The present technology provides a user with suggested prompts after the user has initiated the display of a prompt block on a page of a workspace. The page can be an empty page or include text content that is outside the prompt block. The suggested prompts can be based on the text content that is outside the prompt block or the relative location of the prompt block on the page. In some implementations, the suggested prompts are pre-defined prompts (e.g., prompts created and saved by users or default prompts associated with the workspace). The AI system can also create new prompts based on the text content or the relative location of the prompt on the page.

In one example, a computer-implemented method for suggesting prompts on a page of a workspace includes receiving an input at a particular location on the page of the workspace. The page can include in-page text content. In response to the input, the method includes displaying a prompt block configured to initiate a generative process to create in-block content. The prompt block can be embedded as an in-page object on the page. The in-page text content can be located outside of the prompt block. The method can include causing an LLM system to create a set of suggested prompts. Each prompt in the set of suggested prompts can include instructions configured to create generative content of a respective type for the content of the workspace when executed by the LLM system. The set of suggested prompts can be created based on at least a portion of the in-page text content and a relative location of the prompt block to the at least a portion of the in-page text content on the page. The method can include displaying the set of suggested prompts as a set of control items of the workspace. Each of the set of control items can be selectable to input as a prompt for generating content based on the content of the workspace. In one example, the generated content populates the prompt block.

In another example, a computer-implemented method for suggesting prompts on a page of a workspace can include receiving an input at a particular position on the page of the workspace. In response to the input, the method can include displaying a prompt block configured to initiate a generative process to create in-block content. The prompt block can be embedded as an in-page object on the page. The method can include causing an LLM system to create a set of suggested prompts. Each prompt in the set of suggested prompts can include instructions configured to create generative content of a respective type for the content of the workspace when executed by the LLM system. The set of suggested prompts can be created based on in-page text content or a relative location of the prompt block on the page. The method can include displaying the set of suggested prompts as a set of control items of the workspace. Each of the set of control items can be selectable to input as a prompt for generating content based on the content of the workspace.

In yet another example, at least one computer-readable medium carries instructions that can cause the at least one processor to perform operations for suggesting prompts on a page of a workspace when executed by at least one processor. The operations can include receiving an input at a particular position on the page of the workspace. The page can include in-page text content. In response to the input, the operations can include displaying a prompt block configured to initiate a generative process to create in-block content. The prompt block can be embedded as an in-page object on the page. The in-page text content can be located outside of the prompt block. The operations can cause an LLM system to create a set of suggested prompts. Each prompt in the set of suggested prompts can include instructions configured to create generative content of a respective type for the content of the workspace when executed by the LLM system. The set of suggested prompts can be created based on at least a portion of the in-page text content and a relative location of the prompt block to the at least a portion of the in-page text content on the page. The operations can include displaying the set of suggested prompts as a set of control items of the workspace. Each of the set of control items can be selectable to input as a prompt for generating content based on the content of the workspace. The generated content can be for populating the prompt block.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page:

to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into Transaction-Queue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/ saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.
Software Platform FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, and a meeting and calendar template 114. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool

122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
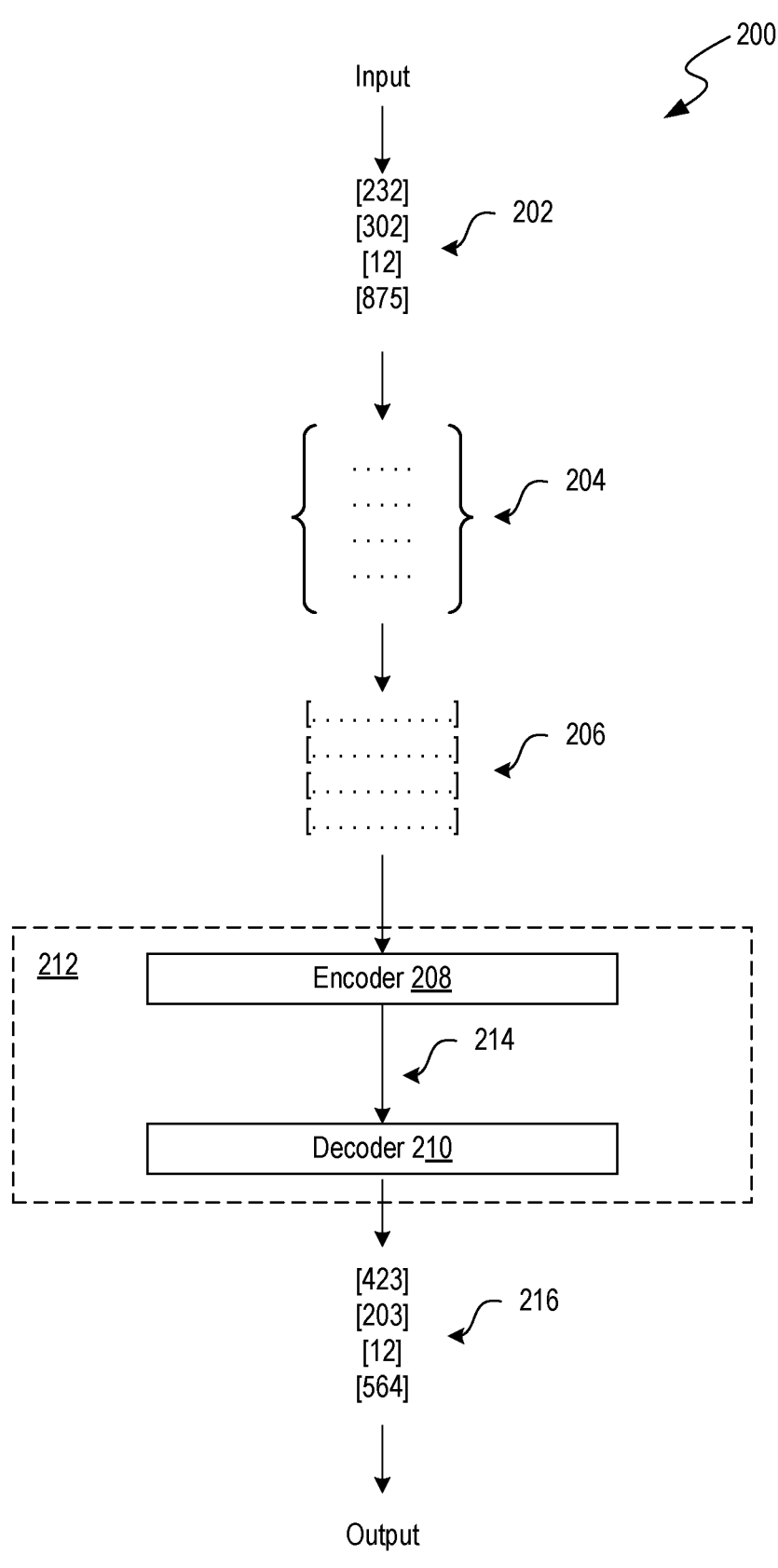
FIG. 2 is a block diagram of a transformer neural network, which may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

AI Blocks

FIGS. 3A through 3E are exemplary views of a workspace page 300 for creating in-block content (e.g., in-block text content) based on in-page content. As used herein, in-block content refers to text (or other content) that is displayed within a single block (e.g., inside boundaries defining the block). In-page content refers to text that is displayed within a single page of a workspace (e.g., inside boundaries or edges defining the page). The workspace page 300 can be displayed on a display of an electronic device (e.g., a computer system 1500 described with respect to FIG. 15). The workspace page 300 can be associated with a workspace that includes multiple pages of a variety of types. In some implementations, the multiple pages include templates such as those described with respect to FIG. 1.

As shown, the page 300 includes multiple blocks (also referred to as "content containers" or "containers") displaying text (e.g., blocks 305, 306 and 308). The blocks 305, 306, and 308 are objects that are embedded within the page 300 and are configured to include content (e.g., content displayed inside the blocks). For example, the block 305 includes a title and blocks 306 and 308 include body-style text. The block 308 also includes a link 309 providing a connection to content that is external to the page 300. The link 309 can be an internal link that points to other pages within the same workspace, a relative link that points to a file relative to the current page's location, a link to a social media post or profile, a URL link pointing to a public content source, a link to other external databases (e.g., databases associated with cloud storage, messaging software applications, or audio or video conference applications) or any other type of link.

Figure 3A:
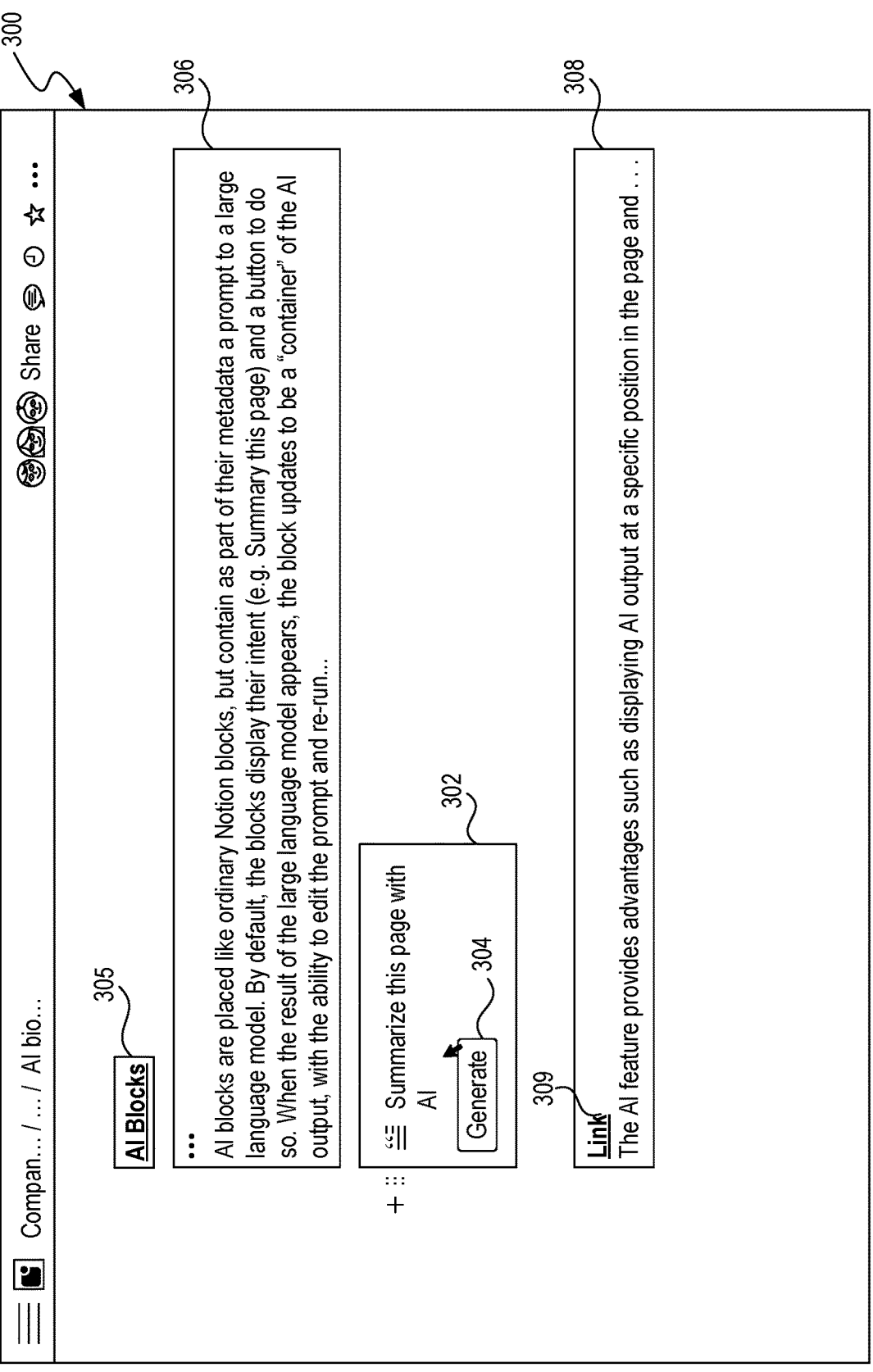
FIGS. 3A through 3E are exemplary views of a workspace page for creating in-block content based on in-page content.

The page 300 also includes an AI block 302 in FIG. 3A. An AI block is a prompt block that enables a user to provide instructions (e.g., prompts) to an AI system to perform actions. The AI block can, however, include or be associated with predefined instructions that cause the AI system to perform a particular action. For example, the AI block 302 can be associated with pre-defined instructions that can initiate processes to create AI-based generative content of a particular type based on existing content. The existing content can include all or a portion of the content included on the page 300 concurrently with the AI block 302. The existing content can also include content that is external to the page 300.

In some implementations, the AI block 302 is displayed on the page 300 as part of a predefined template (e.g., any of the templates 108, 110, 112, and 114 described with respect to FIG. 1). In some implementations, the AI block 302 is displayed on the page 300 in response to an input from a user. The input can include, for example, a click, a drag, a tap, a double click, or a combination thereof provided via a user input device or a control device (e.g., an input/output device 1520 or a control device 1522 in FIG. 15) when a cursor or a caret is positioned on the page 300. For example, a user can provide an input when a cursor is positioned at a location on the page and the AI block is displayed at that location in response to the input. The input can also include text input (numbers, letters, characters, etc.) or a return key input provided via a keyboard. In some implementations, the text input can be on a text field displayed on the page 300.

The particular type of content associated with an AI block can be, for example, a summary or a list of action items. The particular type can also be any other type of action that causes AI to generate text (e.g., shortened or lengthened text, a translation, correction of grammar and/or typographical errors, or changed text style). The particular type can also include, for example, bullets, numbered lists, checkboxes, tables, code blocks, diagrams (e.g., via code blocks) and/or any other type of content applicable to blocks. The particular type of AI content associated with an AI block can be defined by a user. For example, the user can select the type of content from a list of different types. The particular type of AI content associated with an AI block can also be predefined based on a template.

The process to create generative content can be initiated by a user input on the AI block 302. For example, the AI block 302 includes one or more control elements (e.g., a control item 304). A control item refers to a visual element on a graphical user interface that is associated with a particular action or interaction performed in response to receiving an input on the control item. In some implementations, a control item is selectable so that a user can provide an input (e.g., a click input) to select to perform the action associated with the control item. In some implementations, a control item includes a text field that allows a user to input text inside the control item. For example, a user provides an input when a cursor is positioned on the control item 304 to initiate an action associated with the AI block 302 in accordance with instructions associated with the AI block. In FIG. 3A, an input on the control item 304 can initiate an action to summarize the content on the page 300 using AI. The process of creating generative content can include sending instructions to generate content of a particular type to a remote AI system (e.g., via the API 128 described with respect to FIG. 1). The process also includes sending a copy of the content displayed on the page 300 to the AI system and receiving from the AI system generative content to be displayed on the page 300, as shown in FIG. 3B.

Figure 3B:
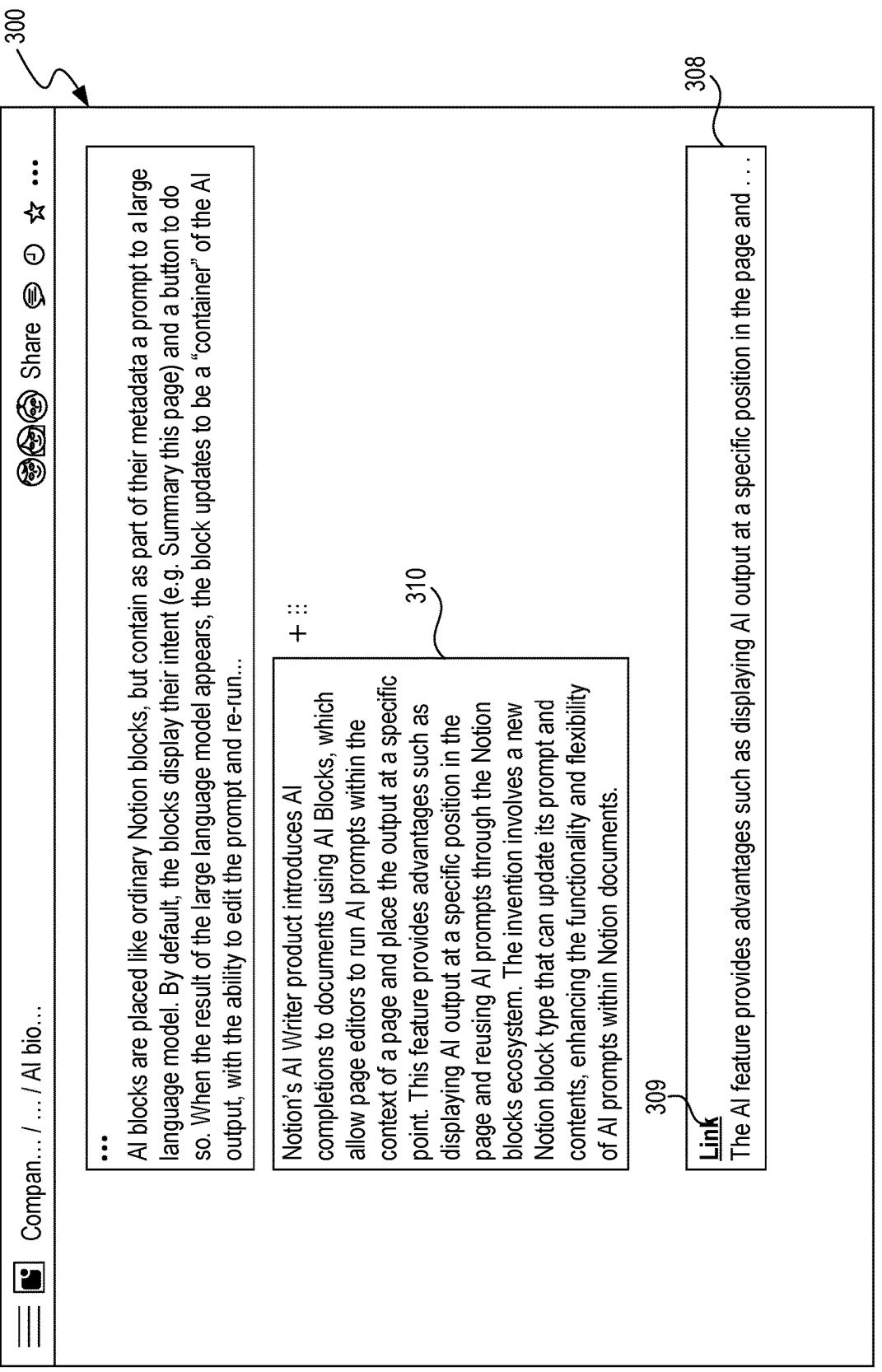

In FIG. 3B, the AI block 302 has been modified to be a block 310 (e.g., a text block) that includes the generative content. For example, the page 300 no longer includes the block 302 and is instead displaying the block 310 at the same location. The block 310 is a block configured for including text and is not associated with a specific prompt that would allow communication with the AI server system, in one example. The modification can include changing an appearance of the respective block such as the shape and/or size of the respective block. For example, the block 310 in FIG. 3B has been expanded from block 302 to fit the generative content. As the size of the block 310 has increased, the relative position of the block 306 and/or the block 308 has been adjusted (e.g., moved) to conform with the size of the block 310. The generative content in the block 310 has been generated based on the instructions associated with the AI block 302. For example, the text shown in the block 310 can be a summary of the text displayed on the page 300, such as the text displayed in the blocks 305, 306, and/or 308 and/or content from an external source (e.g., accesses via the link 309). In some implementations, the instructions associated with the AI block 302 define the content to be used for generating the generative content. Although FIGS. 3A through 3E generally show content contained in blocks, the page can include in-page content outside of the blocks 305, 306, and/or 308. As such, the summary can be based on in-page content that is inside the page but not necessarily inside of any block.

Figure 3C:
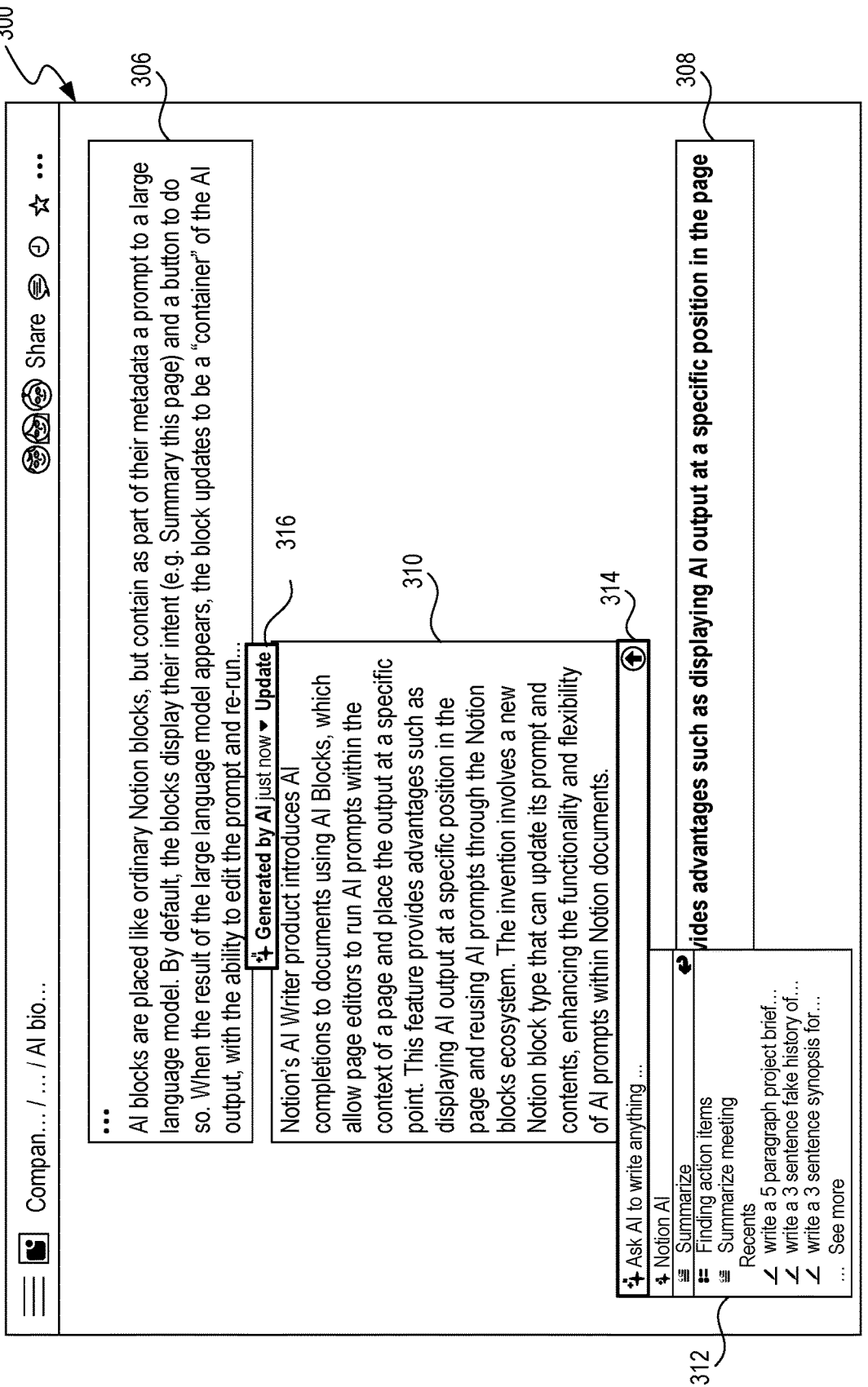

In FIG. 3C, in response to another user input, the page 300 displays a prompt block 314 and a drop-down menu 312. For example, the user has provided an input at a location on the block 310 that initiates the display of the prompt block 314 and the drop-down menu 312. The prompt block 314 can be configured to receive user input from the user that includes instructions to perform an action by the AI system (e.g., the prompt block 314 can receive text input from the user). In one example, the prompt block includes a text field that allows a user to type text inside the prompt block that can then be sent to the AI system (e.g., in response to a user input). The drop-down menu 312 includes a list of possible actions that could be performed with the block 310. As shown, the "possible actions can include" "Summarize," "Find action items," and "Summarize meeting." The drop-down menu 312 can also include a list of recent actions performed by AI blocks on the page 300 or recent actions performed by any AI action.

In some implementations, an indication (e.g., a color, shape, or pattern) can be applied to indicate the type of content that is currently displayed. For example, the item "Summarize" is highlighted, indicating that the content currently displayed in the block 310 includes a summary of the other in-page content (e.g., content of the block 306 and/or the block 308). The page 300 in FIG. 3C also includes a block 316 configured to receive a user input to edit and/or update the content in the block 310. For example, the user can provide an input on the block 316 to update (e.g., redo) the summary based on updated content included on the page 300.

In some implementations, a user can choose a type of block to be displayed. For example, in response to a user input, the page 300 displays a block and a list of a variety of blocks. The variety of blocks can include AI blocks (e.g., the AI block 302 in FIG. 3A), text blocks (e.g., blocks 305, 306, and 308), or prompt blocks (e.g., the block 314 in FIG. 3C). The different blocks can be associated with different actions.

Figure 3D:
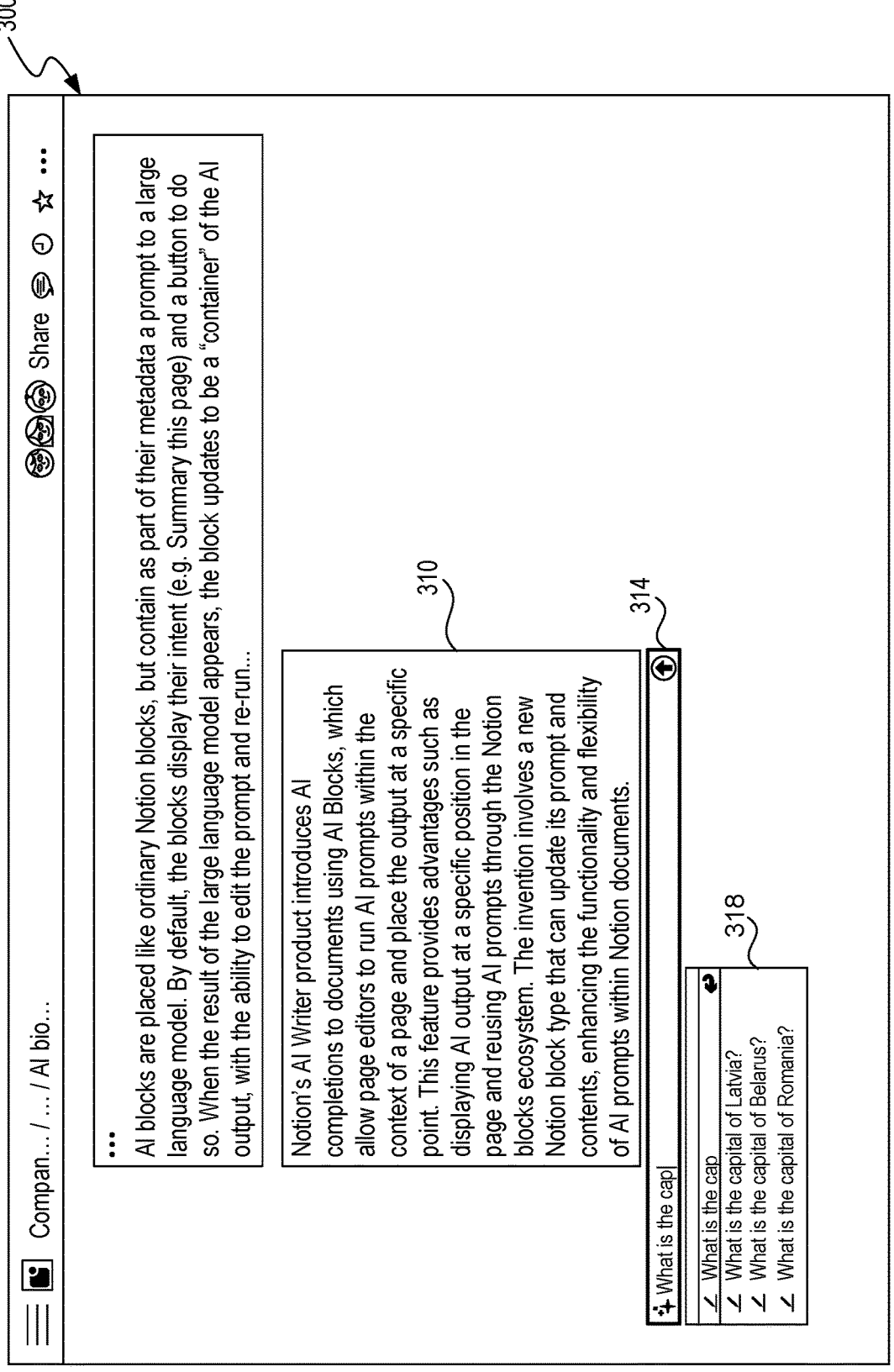
Figure 3E:
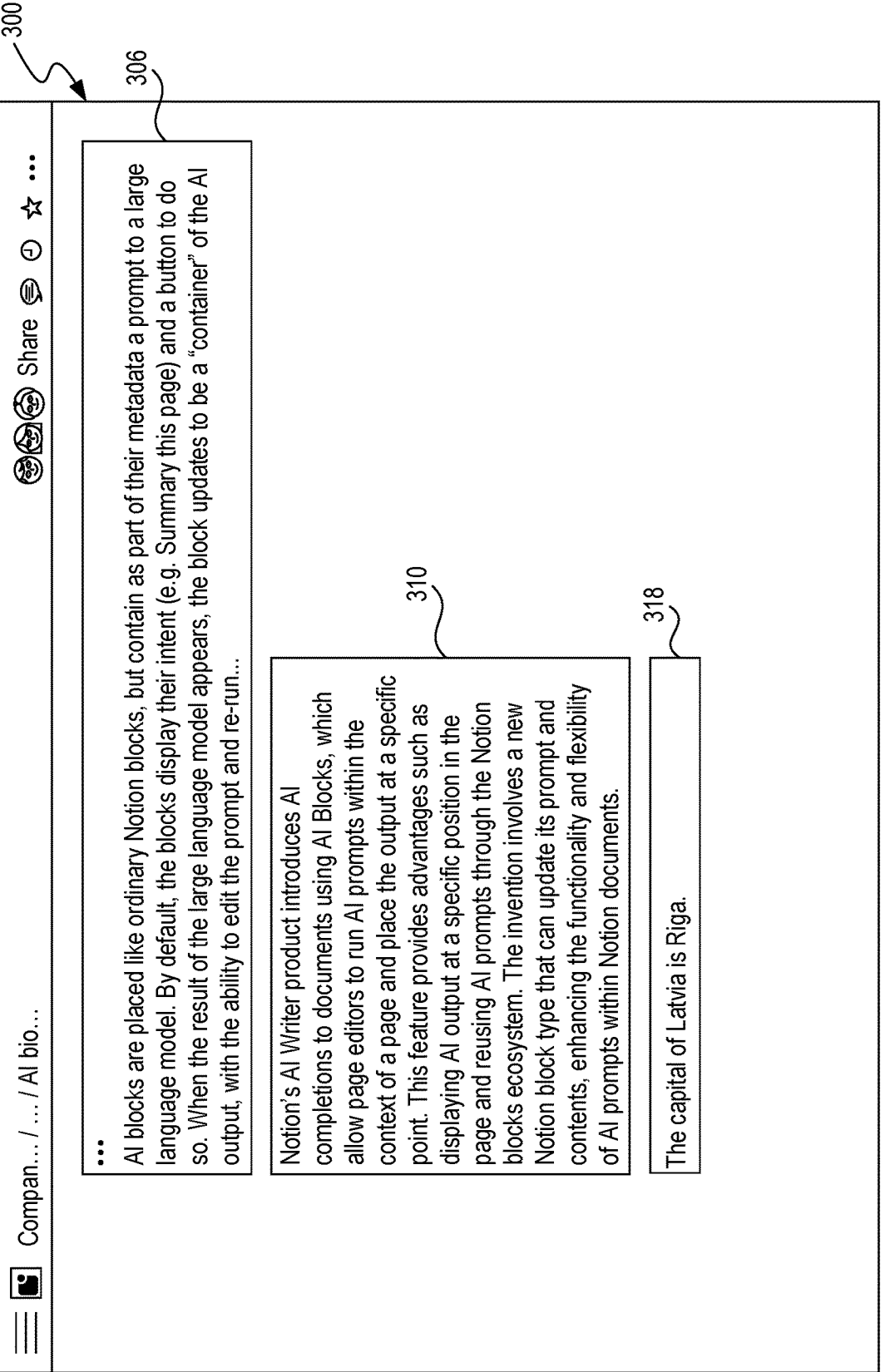

In FIG. 3D, a user has provided a text input on the prompt block 314 that corresponds to a question. The prompt block 314 can include a prediction feature displayed as a block 318 (e.g., a block including a drop-down list) that displays predictions of popular text inputs based on the user's input. The prompt block 314 is not associated with a predefined action that is based on the content displayed on the page 300 such as an AI block does. Instead, the prompt block 314 can, for example, use NLP to answer a question. In FIG. 3E, the page 300 includes a content block 318 that provides an answer to the question presented by the user in FIG. 3E. For example, in response to a user input asking "What is the capital of Latvia," the content block 318 displays the text "The capital of Latvia is Riga."

Figure 4:
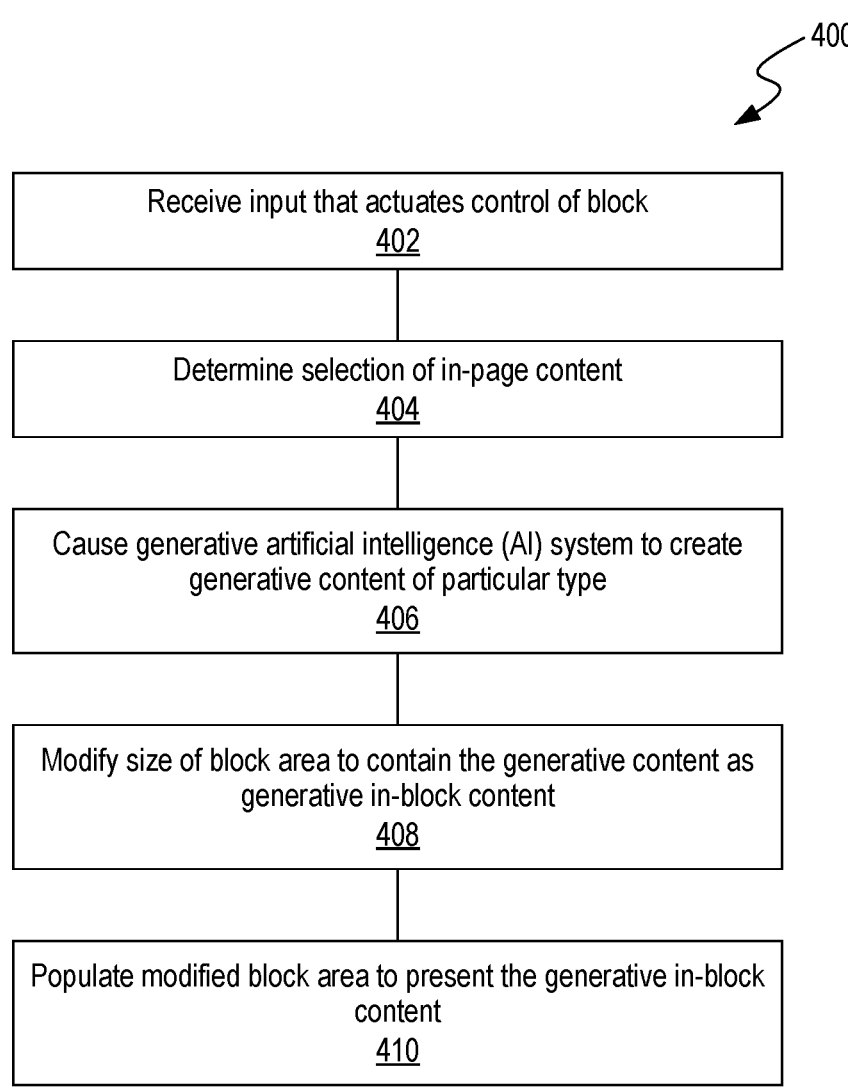
FIG. 4 is a flow diagram illustrating processes for creating in-block content on a page of a workspace.

FIG. 4 is a flow diagram illustrating processes 400 for creating in-block content on a page of a workspace. The processes 400 can be performed by an electronic device (e.g., the computer system 1500 described with respect to FIG. 15). The processes 400 can include displaying a graphical user interface such as the page 300 described with respect to FIGS. 3A through 3E, which is associated with a workspace.

At 402, the device can receive an input that actuates a control of a block (e.g., the AI block 302 displayed on the page 300 in FIG. 3A). The block can be configured to initiate a generative process to create in-block content of a particular type. The block can be embedded as an in-page object on a page of the workspace. For example, a user can provide a user input by clicking the control item 304 on the page 300 to initiate the generative process of summarizing text included on the page 300 in FIG. 3A.

The block can have dimensions that define a block area (e.g., an area defined by the boundaries of the AI block 302) occupying a corresponding page area on the page 300 of the workspace. For example, the AI block 302 has a rectangular shape defined by vertical and horizontal dimensions. The AI block 302 is displayed within the page 300 so that the AI block 302 occupies a portion of the page 300. In some implementations, the block can include a heading or a description of the action of the block to indicate to the user the type of content that can be generated by the block. The description can include a symbol, a text phrase, or both.

In some implementations, the block is displayed as an in-page object in response to a user input. For example, the user provides an input when a cursor is positioned within an area below the block 306 on the page 300. In response to the user input, the AI block 302 is displayed. In some implementations, the block is displayed in accordance with instructions associated with a page (e.g., a template). For example, a page can be associated with a meeting transcript or meeting notes templates. In such instances, the block for summarizing the content might be displayed automatically when a meeting ends. The meeting ending can be detected when indicated by a user or based on an indication being received from an external source such as a video conferencing software application.

In response to the input, at 404 the device can determine a selection of in-page content based on a location of the block relative to the in-page content and the particular type of in-block content. The in-page content can be presented on the page of the workspace and be located outside of the block area. For example, the page 300 includes text content in the blocks 305, 306, and 308 in FIG. 3A. The block 305 includes a title and the blocks 306 and 308 include body text. The blocks 305, 306, and 308 are all different from the AI block 302 and are thereby positioned outside the boundaries of the area defined by the AI block 302. Determining the selection of the in-page content can include a selection of the text content in some or all of the blocks 305, 306, and 308 included on the page 300. In another example, determining the selection of the in-page content can include a selection of the text content outside of the blocks 305, 306, and 308 but included on the page 300.

In some implementations, determining the selection of in-page content can include determining a location of an additional block on the page of the workspace. For example, the device can determine that the AI block 302 is below the blocks 305 and 306 and above the block 308. The selection of the in-page content can be bounded between any two of the blocks (e.g., the AI block 302), the additional block (e.g., any of the blocks 305, 306, or 308), and a border of the page (e.g., a border of the page 300) of the workspace. For example, the selection can include content on the page that is between the AI block 302 and the block 305 (e.g., the text included in the block 306).

In some implementations, determining the selection of in-page content is based on the location of the block relative to the in-page content, where the particular type of in-block content includes selecting a portion of the in-page content bounded by the location of the block and a top or bottom of the page of the workspace. For example, the selection includes any content on the page that is above the AI blocks 302 (e.g., the blocks 305 and 306 positioned between the AI block 302 and the top border of the page 300) or any content on the page that is below the AI blocks 302 (e.g., the block 308) in FIG. 3A.

In some implementations, determining selection of in-page content based on the location of the block relative to the in-page content and the particular type of in-block content includes selecting an entirety of the in-page content bounded by the page of the workspace (e.g., selection includes all of the blocks 305, 306, 308 and any other in-page content outside of AI block 302).

In some implementations, the selection is determined based on the particular type of in-block content. For example, the type of content to be generated by the instructions associated with the AI block 302 is a summary type. The instructions can define the content to be used as a basis for the summary. The device thereby can transmit to an AI system the instructions to generate content as well as a copy of the text that is defined by the instructions. In some implementations, the selection is included in the instructions as a default. For example, the instructions define that the content to be selected is all text that is positioned above the AI block 302 on the page 300. In some implementations, a user can define the selection or change the default selection by modifying the instructions associated with an AI block.

At 406, the device can cause a generative AI system to create generative content of the particular type based on input including the selection of the in-page content. Causing the generative AI system to create the generative content of the particular type can include sending the AI system instructions to create the generative content based on a particular text as well as sending a copy of that text to the AI system.

In some implementations, causing the generative AI system to create the generative content can include accessing additional in-page content from multiple pages of the workspace and providing the selection of the in-page content and the additional in-page content as input to the generative AI system. The generative content can be created based on the selection of the in-page content and the additional in-page content. For example, the in-page content can include a link (e.g., the link 309 in FIG. 3A) or other type of reference that allows access to content on another page of the workspace. As another example, the instructions that define the content to be used as a basis for the generative content can include instructions to access content on one or more pages of the workspace that are different from the page in which the AI block is located. The instructions can include accessing sub-pages that are hierarchically under the page where the AI block is located. The instructions can also include accessing other pages. For example, the instructions can include accessing meeting notes from previous meetings associated with the same project within the workspace.

In some implementations, causing the generative AI system to create the generative content can include accessing external content from a public source (e.g., a website) and providing the external content in addition to the selection of the in-page content as input to the generative AI system. The generative content is created based on the external content and the selection of the in-page content. For example, the in-page content includes textual content including a URL linked to an online source of content (e.g., the link 309 in FIG. 3A can include a URL). Causing the generative AI system to create the generative content can include causing an LLM of the generative AI system to create the generative content based in part on the URL. For example, the URL includes a phrase, and the generative content is created based in part on that phrase.

In some implementations, causing the generative AI system to generate the particular type of the generative content includes causing an LLM of the generative AI system to create the generative content based on the textual content and/or content retrieved from the online source of content. For example, the URL is associated with a website, and the generative content is created partly based on the content on the website. The instructions that define the content to be used as a basis for the generative content can include instructions to access the content on the website associated with the URL.

In some implementations, causing the generative AI system to create the generative content can include accessing external content that is from a remote database. For example, the link 309 in the block 308 on the page 300 can be associated with a social media post or profile or a database associated with a cloud storage, a messaging software application, or an audio or video conference application. Causing the generative AI system to generate the particular type of the generative content includes causing the LLM of the generative AI system to create the generative content based on the content retrieved from the remote database.

At 408, the device can modify a size of the block area to contain the generative content as generative in-block content. The size of the block area can be dynamically constrained to fit the generative in-block content. For example, in FIGS. 3 and 4, the AI block 302 for initiating the creation of the generated in-block content has a first size and the block 310, which includes the created generative in-block content, has a second size that is different from the first size. In some implementations, modifying the size of the block area to contain the generative content can include expanding the size of the block area to fit the generative content as in-block generative content (e.g., the second size of the block 310 is expanded from the first size of the AI block 302). The device can expand the page area in tandem with the block area and/or the device can displace a portion of the in-page content to accommodate the expanded page area. For example, the block 310 occupies a greater area than the block 302 on the page 300. The AI block 302 in FIG. 3A is no longer displayed because the block 310 including the generative content has replaced the block 302. Also, the block 308 positioned below the block 310 is moved so that the block 310 can occupy more space within the page 300 as it expands.

At 410, the device can populate the modified block area to present the generative in-block content. The generative in-block content can replace, change, or augment other in-block content. In some implementations, the device further dynamically expands the size of the block area while populating the block with the generative content created by the generative AI system. For example, the size of the block 310 is dependent on the length of the generative content so that the block 310 can fit the generative content in FIG. 3A. In some implementations, the control is contained in the block. Populating the block with the generative content can include removing the control from the block to populate the block with the generative in-block content.

In some implementations, the device can detect a change to the in-page content. For example, text is added, removed, or changed on the page. In response to detecting the change to the in-page content, the device can automatically cause the generative AI system to regenerate content. For example, the generative content in the block 310 in FIG. 3B is generated based on the content included in the block 306. In an instance that the content included in the block 306 is changed, the device can automatically update the content in the block 306. In some implementations, the device can cause the generative AI system to regenerate the content in response to receiving a user input. For example, the user can provide a user input on the block 316 in FIG. 3C to initiate the regenerate the content. The device can modify the block to present the regenerated content as in-block content. For example, the size or shape of the block area can be changed in tandem with changing a size or amount of the regenerated content.

In some implementations, the particular type of in-block content is a predefined type corresponding to a summary. Causing the generative AI system to generate the summary includes causing an LLM of the generative AI system to generate a summary of the selection of the in-page content. For example, the block 310 in FIG. 3B includes a summary that is created based on the content included in the block 306 and/or the block 308.

In some implementations, the particular type of in-block content is a predefined type corresponding to a list of action items. Causing the generative AI system to create the generative content can include causing an LLM of the generative AI system to generate a list of action items based on text included in the selection of the in-page content. The organization and style of the list of action items can be different from the organization and style of the summary. The list of action items can be formulated to include, for example, bullet points or checkboxes, while a summary includes one or more paragraphs.

In some implementations, the particular type of in-block content is a user-defined type of generative output. Causing the generative AI system to create the generative content can include causing an LLM of the generative AI system to generate the user-defined type of generative output based on the text included in the selection of the in-page content. In one example, the particular type of in-block content is a predefined type corresponding to other types of content. In some implementations, the user can define the type of generated content. Such content can include a summary focusing on a particular matter defined by a user. In one example, the user defines a type of content to include a summary focusing on a particular aspect or keyword of the in-page content (e.g., a summary of deliverables to be delivered by a particular due date). As another example, the user defines a type of content to include a summary that compares prior meeting notes with the latest meeting notes in order to summarize what is different in the latest meeting notes.

Saving and Sharing Prompts

Figure 5A:
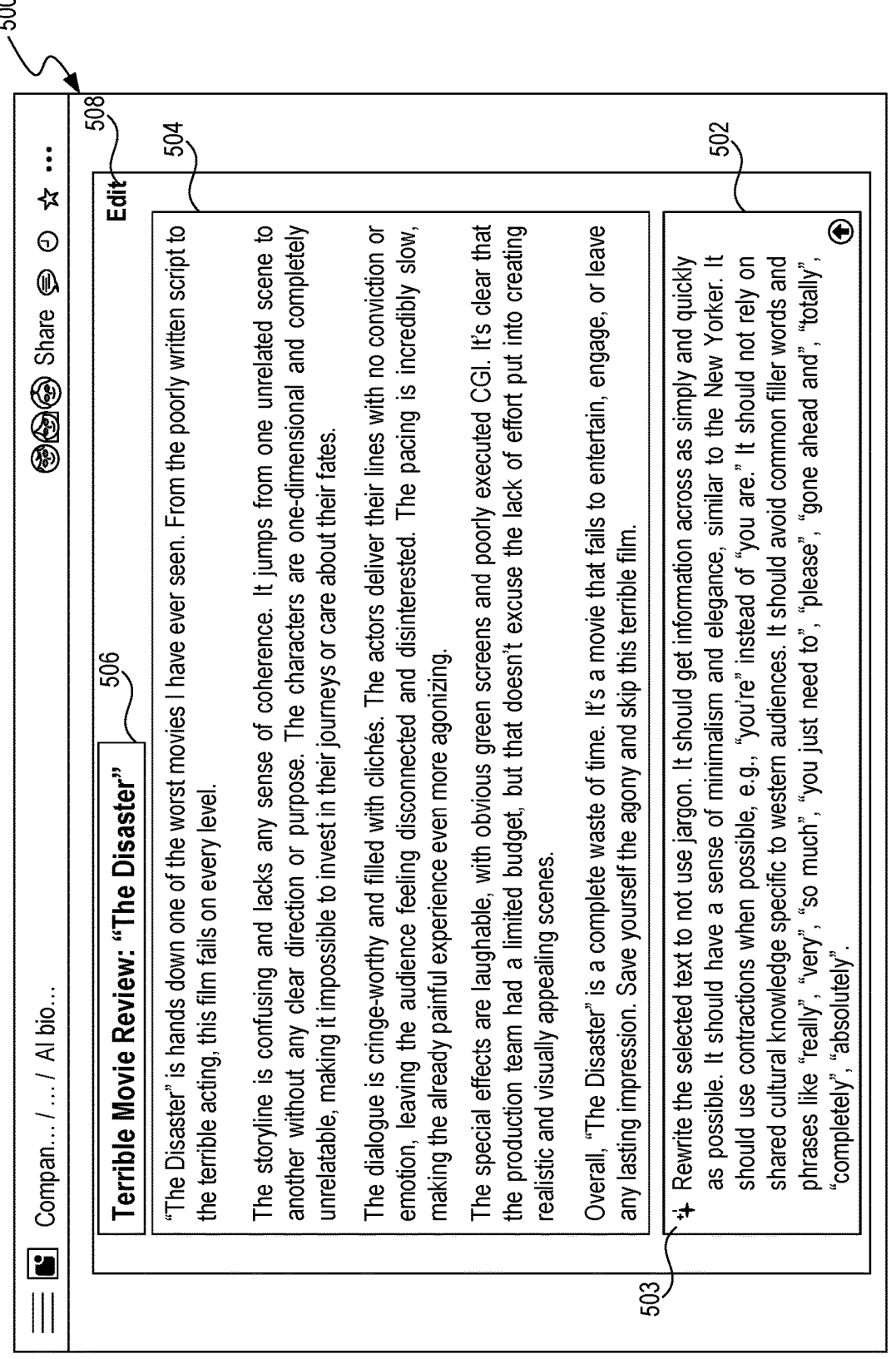
FIGS. 5A through 5E are exemplary views of workspace pages for saving and sharing prompts.

FIGS. 5A through 5E are exemplary views of workspace pages for saving and sharing prompts. In some implementations, the page 500 corresponds to the page 300 described with respect to FIGS. 3A-3E. In FIG. 5A, the page 500 includes blocks 504 (e.g., text blocks) and 506 (e.g., a title block) including text content. The page 500 also includes a prompt block 502. As described earlier, the prompt block can be configured to receive text input from the user that includes instructions to perform an action by an AI system. For example, the prompt block can include a text field configured for receiving text input from the user, which is then sent to the AI system. The instructions can cause the AI system to generate text based on the instructions. In some implementations, the prompt block is actuated based on an input on a control item (e.g., an icon or a symbol) associated with the prompt. For example, a user can provide an input (e.g., a click input) when a cursor is positioned at a location on the page 500 to initiate a display of a block. The user can further actuate control of the prompt block. For example, the user can click an icon (e.g., an icon 503) on the block that actuates the control of the prompt block. As another example, the user can provide a text command (e.g., "/" or other text symbol) to actuate the control of the prompt block. The actuation of the prompt block can include actuating a text field where the user can type a prompt. In response to an additional input (e.g., a return key) the device can transmit the prompt entered into the prompt block 502 to the AI system and receive in return text content generated by the AI system.

The prompt block 502 in FIG. 5A illustrates an exemplary prompt for generating text content of a particular style. The prompt block 502 includes a prompt with specific instructions to rewrite selected text without the use of jargon. The prompt includes a combination of instructions. In one example, the prompt includes a command (e.g., "rewrite"), the text to be used as a basis for the generated content (e.g., "the selected text"), instructions regarding a desired style (e.g., "getting information across as simply and quickly as possible and using a sense of minimalism and elegance") and several examples describing the desired style. For example, the selected text can refer to the text in the block 504, for example, as indicated by an indicator 508 ("Edit") indicating that the text in the block 504 has been selected for editing by a prompt entered into the prompt block 502.

Figure 5B:
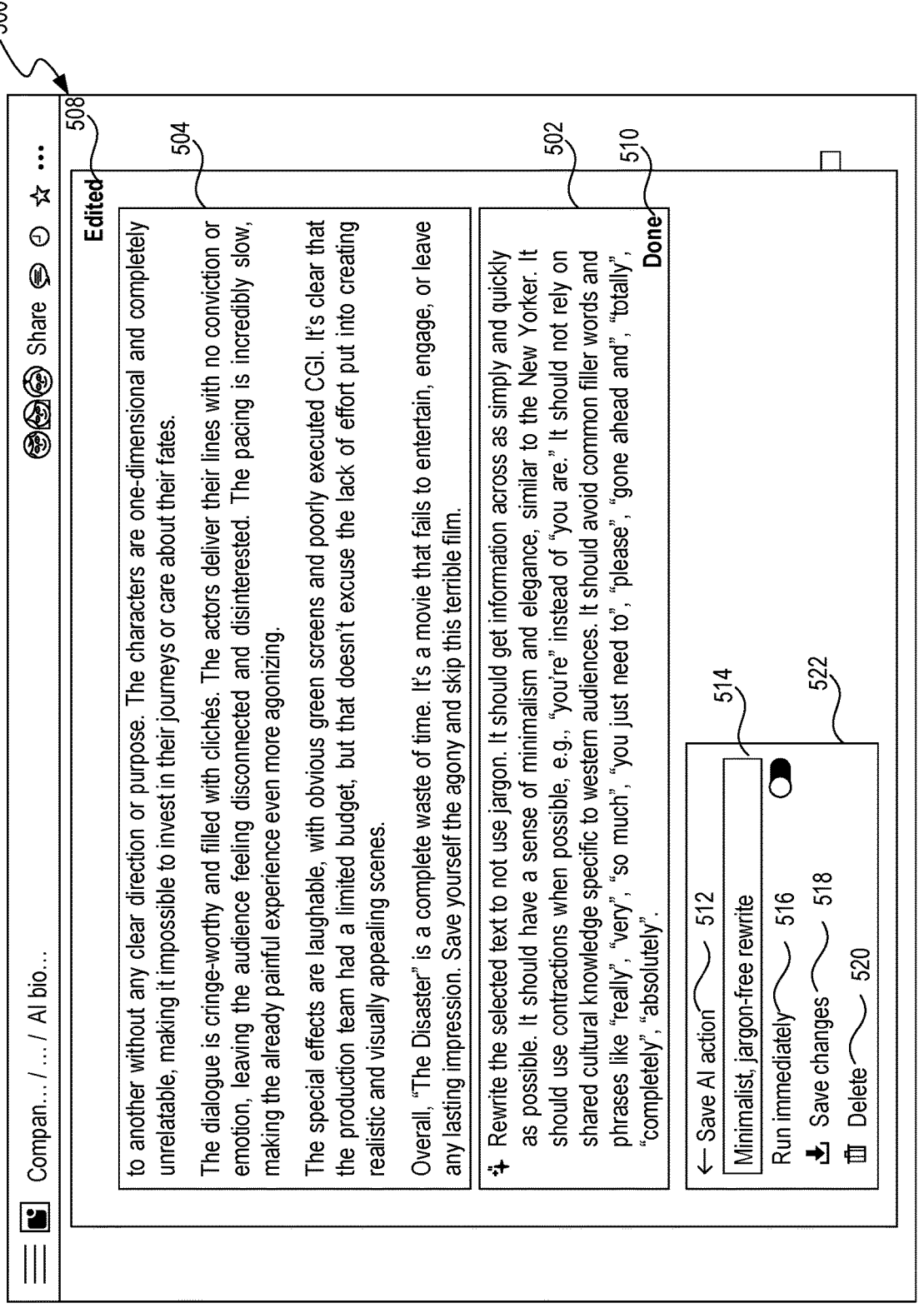
Figure 5C:
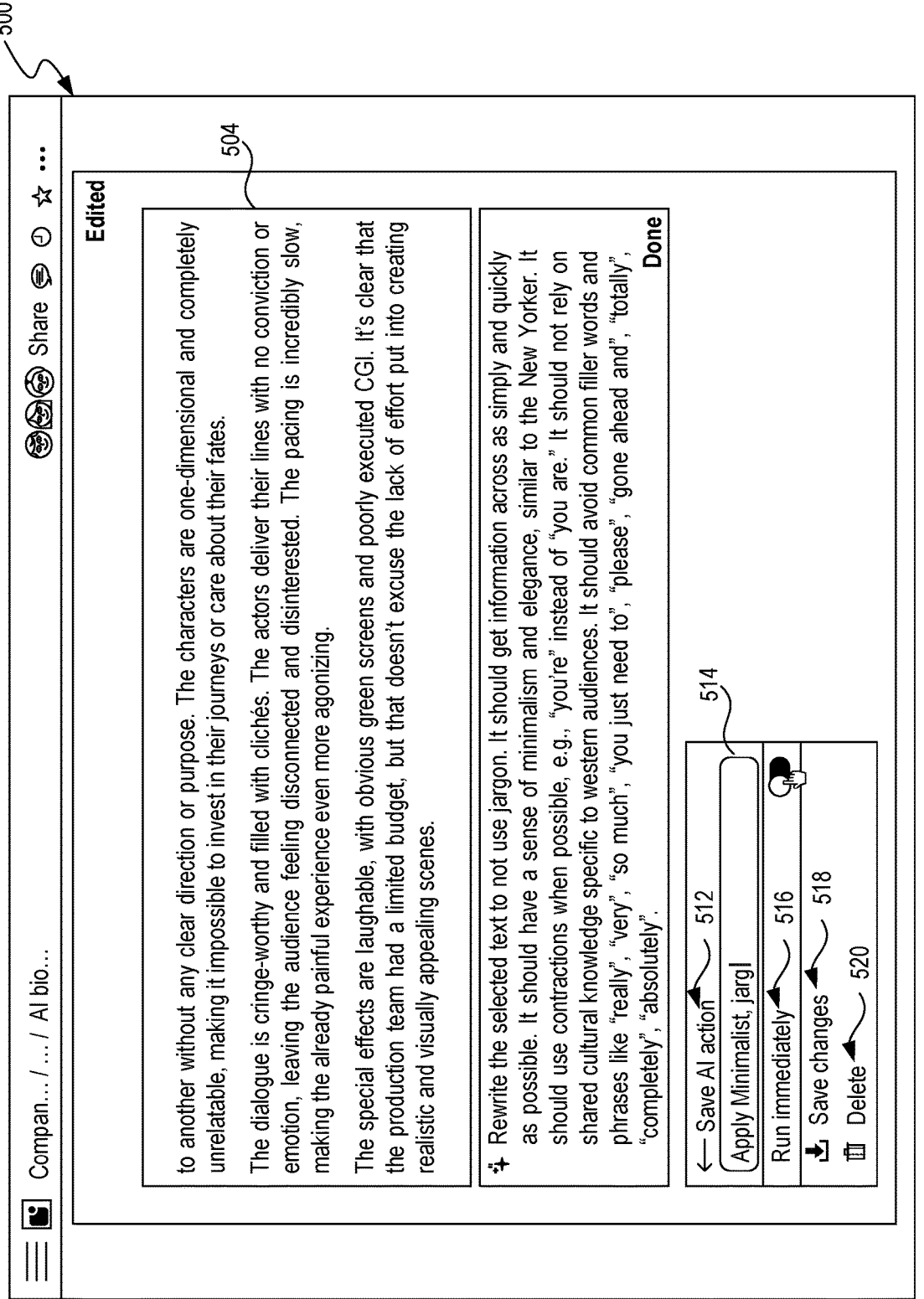

In FIG. 5B, the text content displayed on the block 504 has been modified in accordance with the prompt of the prompt block 502. The indicator 508 has been changed to indicate that the content is edited (e.g., the indicator 508 states "Edited" and an indicator 510 on the prompt block 502 states "Done"). Additionally, the page 500 includes a block 522 including multiple control items (e.g., control items 512, 514, 516, 518 and 520) associated with respective actions that can be performed related to the prompt block 502. The block 522 can be displayed automatically in response to displaying the AI generated content in the block 504 or in response to an input (e.g., a user clicks on a control item or moves a cursor over the prompt block 502).

As shown, the block 522 includes the control item 512 for saving the prompt included in the prompt block 502 and the control item 514 corresponding to a text field that displays a name associated with the prompt. For example, in response to an input on the control item 512, the device saves the prompt (text instructions) included in the prompt block 502 so that the prompt can be accessed by the user or a group of users (e.g., a team) on different pages of the workspace. Additionally, the saved prompt could be accessed on multiple workspaces by the user or the group of users.

The name associated with the prompt can be generated by the AI system based on the prompt in the prompt block 502. In some implementations, the name is generated automatically. For example, the AI system is configured to generate the name for the prompt in response to generating the text content in response to the prompt. In some implementations, the name is generated in response to an input on the control item 512. In one example, the user initiates an action to save the prompt by an input on the control item 512 and the AI system generates the name in response to the input. The name generated by the AI system can be descriptive and unique so that a user can identify the prompt based on the name. In some implementations, the name follows a certain nomenclature that is predefined by the user or is associated with the workspace.

The control item 516 can be used for defining whether the action defined by the prompt in the prompt block 502 should be performed automatically as changes are made to the text content or the prompt. The control item 518 can allow a user to save changes made to the prompt and the control item 520 can allow a user to delete the saved prompt. In some implementations, when the control item 516 is activated, the prompt can function similar to built-in prompts. For example, when the control item 516 is activated and a user provides a user input on the prompt block 502, the content is generated or edited automatically in response to the prompt instructions (e.g., without allowing the user to edit the prompt before running the operation).

A user can provide an input on the control item 514 to edit the AI-generated name by providing an input in the text field of the control item 514. For example, in FIG. 5C, a user has activated the control item 514 (e.g., illustrated as a modified appearance of the control item 514) to delete the AI-generated name. The user can modify or rewrite the name and save the modified or rewritten name (e.g., by an input on the control item 518).

Figure 5D:
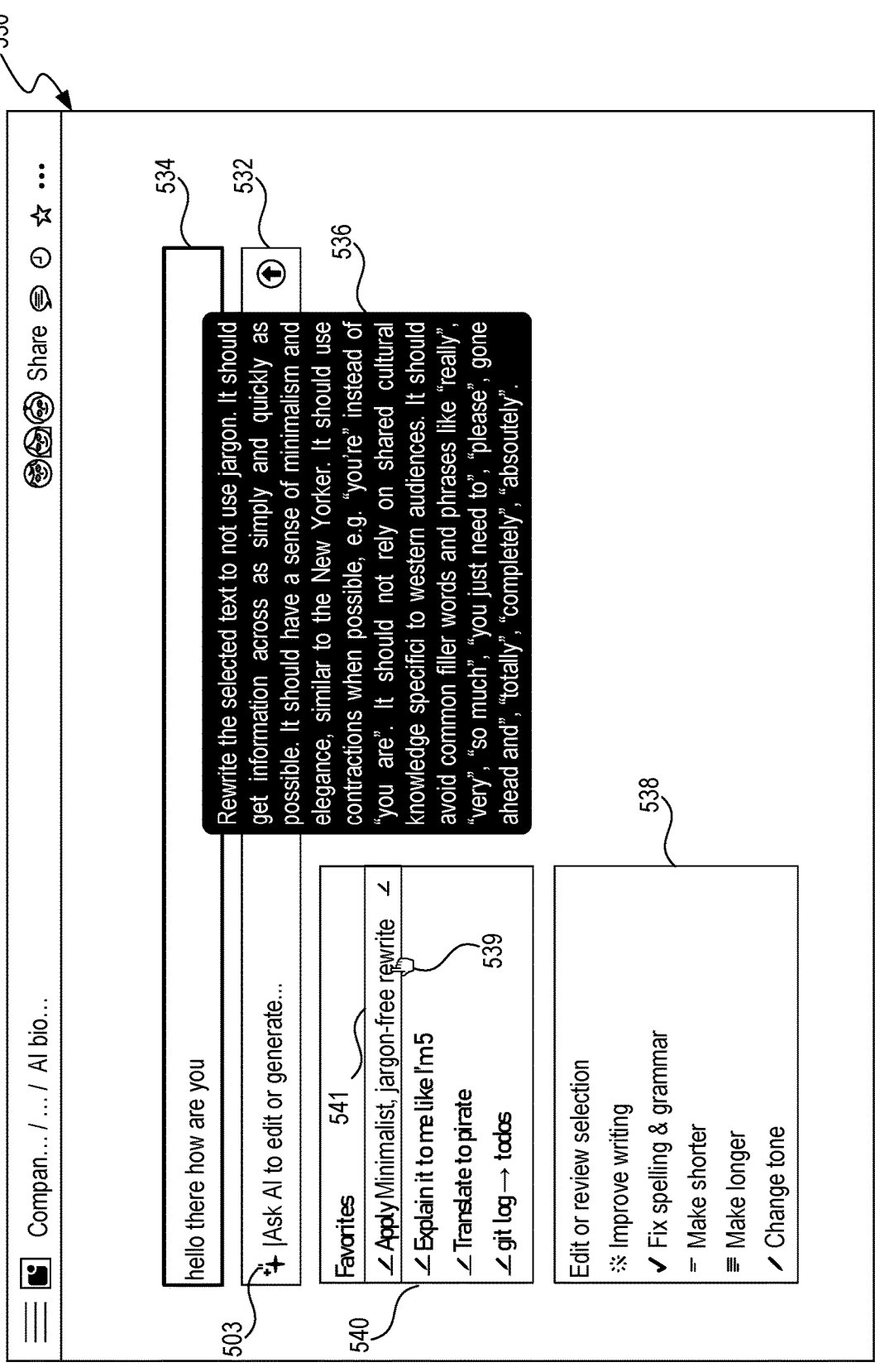

FIG. 5D shows a workspace page 530. The page 530 is different from the page 500 and can be associated with the same workspace as the page 500. The page 530 includes a block 534 including text content and a prompt block 532 for receiving a input. The prompt block 532 can correspond to the prompt block 502 described with respect to FIGS. 5A through 5C. For example, the user has provided an input below the block 534 that causes the device to display a block. A user can then actuate the prompt block 532, e.g., by providing an input on icon 503. Additionally, the page 530 includes a block 540 including names of multiple prompts identifiable by unique names. The names of the multiple prompts are associated with selectable control items (e.g., a control item 541). In some implementations, the names of the prompts in the block 540 are predicted to be most favorable by the user. The prediction can be based on the user's patterns or trends of using prompts or a prediction performed based on the content included on the page 530. For example, the block 540 includes the saved prompt "Minimalist, jargon-free rewrite" described with respect to FIGS. 5A through 5C. Additionally, the block 540 can include other prompts that are either predefined (built-in) or prompts generated and saved by the user (e.g., "explain it to me like I'm 5," "translate to pirate," and "git log→todos").

The page 530 further includes a block 538 that includes multiple prompts for editing and reviewing text content. In some implementations, the prompts can be selected from pre-defined prompts associated with the workspace (e.g., default prompts associated with the workspace) and include, e.g., prompts named "Improve writing," "Fix spelling & grammar," "Make shorter," "Make longer," and "Change tone."

In FIG. 5D, the page 530 also includes a preview block 536. The preview block 536 includes a text describing the actions associated with the saved prompt "Minimalist, jargon-free rewrite." The preview block 536 can be displayed in response to an input on the particular prompt. For example, a user can provide a click input or move a cursor (e.g., a cursor 539) on the saved prompt. The preview can provide information on the saved prompt that allows the user to assess whether to perform the action associated with the prompt.

Figure 5E:
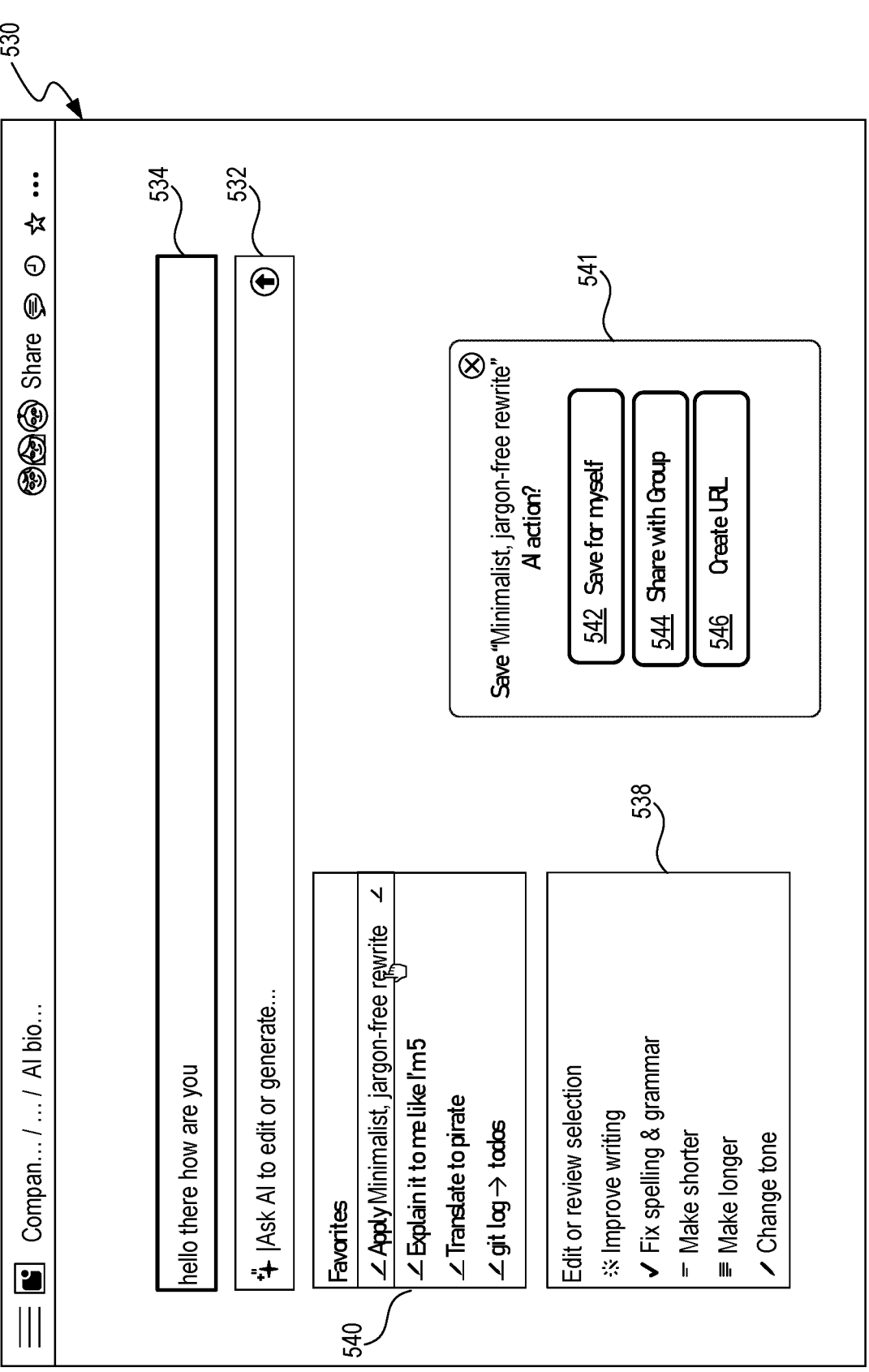

In some embodiments, the page 530 can include a block 541 that provides for different options to save and share prompts, as shown in FIG. 5E. For example, the device can display the block 541 in response to an input (e.g., a click input on the name of the saved prompt or moving a cursor (e.g., a cursor 539) on the name of the saved prompt). The block 541 includes control items 542 ("Save for myself"), 544 ("Share with Group"), and 546 ("Create URL"). In response to an input on the control item 542, the device can save the respective prompt so that the prompt can be used only by the user herself (e.g., by the user who generated the prompt). In response to an input on the control item 544, the device can share the prompt with a group of users. The users can be, for example, all or some of the users associated with the same workspace having access to the pages of the workspace (e.g., teamspace). In response to an input on the control item 546, the device can generate a URL linked to an online source that includes the prompt. The URL can be shared with anyone, e.g., including users associated with the workspace as well as users not associated with the workspace (e.g., outside of the workspace). For example, the URL can provide an access to the prompt from different software applications.

Figure 6:
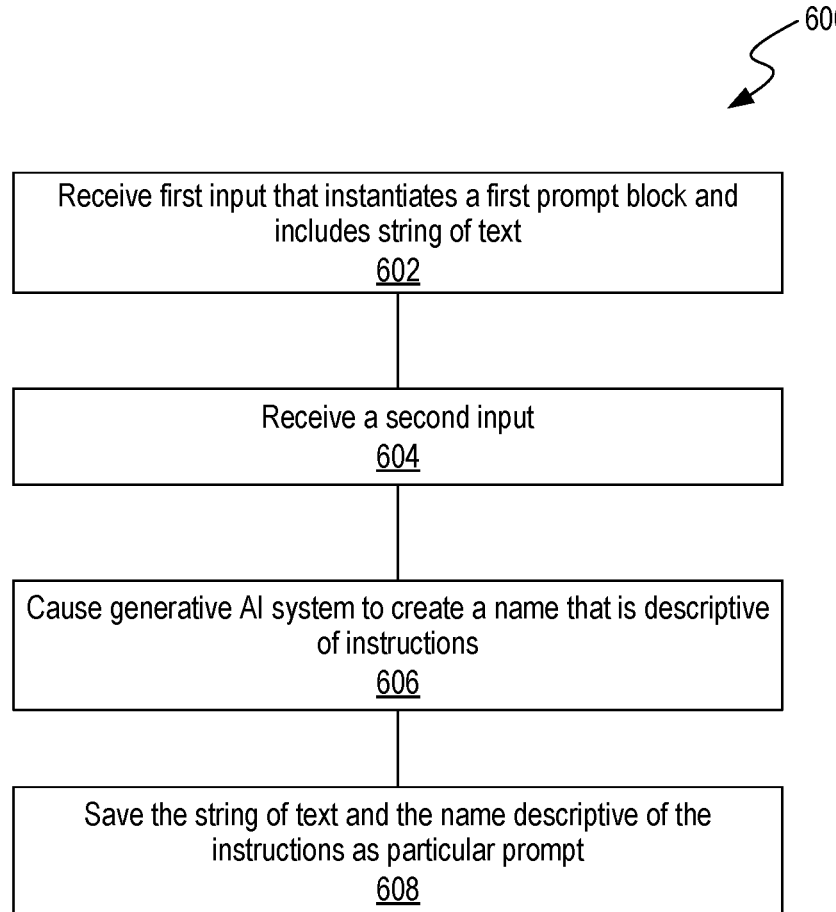
FIG. 6 is a flow diagram illustrating processes for saving and sharing prompts on a page of a workspace.

FIG. 6 is a flow diagram illustrating processes 600 for saving prompts on a page of a workspace. The processes 600 can be performed by an electronic device (e.g., the computer system 1500 described with respect to FIG. 15). The processes 600 include displaying a graphical user interface such as the pages 500 and 530 associated with a workspace described with respect to FIGS. 5A through 5E.

At 602, the device receives a first input that instantiates a prompt block (e.g., the prompt block 502 in FIG. 5A) configured to initiate a generative process to create in-block content. The prompt block can be embedded on a first page (e.g., the page 500 in FIG. 5A) of a workspace configured to include multiple pages.

The first input can include a string of text. The string of text can include instructions that cause the generative AI system to create the in-block content to be displayed on the page. The string of text including the instructions can thereby operate as a prompt to cause the generative AI system to create the in-block content. For example, the prompt block 502 includes a text that instructs a generative AI system to rewrite selected text with a specified style.

Instantiating the prompt block can include displaying the prompt block 502 in FIG. 5A in response to an input on the page 500 (e.g., a click input when a cursor is at a location on the page 500). The prompt block can be initially empty but can include a text field that allows a user to provide a text (e.g., via input on a keyboard). For example, the first input includes a first portion that actuates a control of a text field on the first block (e.g., the prompt block 502 including a text field). The first input can also include a second portion including the string of text provided on the text field (e.g., the text displayed inside the prompt block 502).

At 604, the device receives a second input on the prompt block. The second input can be an input on the prompt block or on a control item associated with the prompt block. At 606, in response to the second input, the device can cause the generative AI system to create a name that is descriptive of the instructions based on the string of text. For example, the control item 514 in the block 522 includes a text field including a name that describes the instructions in the prompt block 502. In some implementations, the generative AI system creates the name descriptive of the string of text using an LLM. For example, the device sends the instructions included in the prompt block 502 to the AI system and the AI system creates the name descriptive of the instructions and returns the name to the device. The device displays the name in the text field of the control item 514.

In some implementations, in response to the second input on the prompt block, the device can display a drop-down menu including a predefined list of control items to perform actions associated with the prompt block. For example, the second input can be an input on a control item associated with displaying a drop-down menu of selectable control items (e.g., the block 522 including the control items 512, 514, 516, 518 in FIG. 5B). Alternatively, the second input can be an input on a return key when a cursor is positioned on the prompt block 502 in FIG. 5A. For example, the return key input can be configured to cause the AI system to generate the text content in accordance with the prompt in the prompt block 502 as well as display the block 522 (e.g., a drop-down list). The predefined list of control items can include a control item for performing an action for saving the string of text inside the prompt block (e.g., the control item 512). The device can then receive a selection input to select the action associated with saving the string of text as a prompt from the list of actions. For example, a user can provide an input to select the control item 512. In response to such input, the device saves the string of text in the prompt block 502 as a prompt having the name identified in the control item 514.

In some implementations, the device causes (e.g., in response to an input) the generative AI system to create the in-block content based on the particular prompt. In some implementations, the device causes the generative AI system to create the in-block content based on the particular prompt and in-page content that is on the page outside the prompt block. The device can display the in-block content on the page of the workspace. An example of displaying AI-generated, in-block content is described with respect to FIGS. 3A and 3B where the block 310 in FIG. 3B includes AI-generated text created based on the instructions included in the AI block 302 in FIG. 3A. Another example of displaying AI-generated, in-block content is described with respect to FIGS. 3D and 3E where the block 318 includes AI-generated text created based on the instructions included in the prompt block 314.

At 608, the device can save the string of text and the name descriptive of the string of text as a prompt. The particular prompt can be identifiable based on the name descriptive of the string of text and be accessible from the multiple pages of the workspace. For example, in FIG. 5B the prompt of the prompt block 502 is saved with the name "Minimalist, jargon-free rewrite." A generative process to create in-block content based on the particular prompt can be configured to be initiated on a respective page of the multiple pages of the workspace by an input on the respective page. For example, a user can select the saved prompt from the block 540 on the page 530 in FIG. 5D by clicking on the corresponding control item 541. The page 530 is different from the page 500, and they are both pages of the same workspace. In response to selecting the control item 541, the device can cause the AI system to generate text content in accordance with the instructions included in the saved prompts.

In some implementations, the particular prompt is configured to be accessed by users associated with the workspace. For example, a user can share the particular prompt by selecting the control item 544 in FIG. 5E to share the particular prompt with a group associated with the workspace.

In some implementations, in response to an input (e.g., an input on the control item 546 in FIG. 5E), the device generates a URL linked to an online source including the particular prompt. The URL can be configured to be copied and shared to users outside the workspace. The URL can allow the users outside the workspace to access the particular prompt.

In some implementations, in response to an input, the device generates a URL linked to an online source including the particular prompt. The URL can be configured to be shared with a group of users. The group of users can be limited to, for example, users of a shared workspace.

In some implementations, the device receives an input on the prompt block to modify the string of text. In response to detecting the modification on the string of text, the device can automatically save the particular prompt to incorporate the modifications to the string of text. For example, the input can include deleting, modifying, or adding text in prompt block 502 to modify the instructions included in the prompt block 502.

In some implementations, the device can further receive an input on an additional prompt block embedded on a second page of the workspace (e.g., the page 530 in FIG. 5D). The device can display a list of prompts including the particular prompt as a drop-down menu from the additional prompt block (e.g., the block 540 includes the particular saved prompt indicated as the control item 541 in FIG. 5D). The device can receive a fourth input to select the particular prompt from the list of prompts (e.g., a click input when the cursor 539 is on the control item 541). In response to the fourth input, the device can initiate the generative process to create in-block content in the additional prompt block.

In some implementations, the device further receives an input to modify the name descriptive of the string of text created by the generative AI system. For example, the input can include deleting, modifying, or adding text in the text field of the control item 514 to modify the name that was originally generated by the AI system in FIG. 5C. The device can save the string of text and the modified name as the particular prompt.

In some implementations, subsequent to saving the particular prompt, the device displays a drop-down menu including a list of prompt names associated with prompts that are categorized as commonly used prompts (e.g., the block 540 in FIG. 5D includes prompts categorized as "favorites"). The particular prompt can be displayed in the list of prompts (e.g., the control item 541).

In some implementations, subsequent to saving the particular prompt, the device displays a drop-down menu including a list of prompts including the particular prompt (e.g., the block 540 in FIG. 5D). In response to an input of moving a cursor (e.g., the cursor 539) on the particular prompt, the device displays a description of actions associated with the particular prompt (e.g., the preview block 536). The description can be created by the generative AI system.

Suggesting Prompts

Figure 7A:
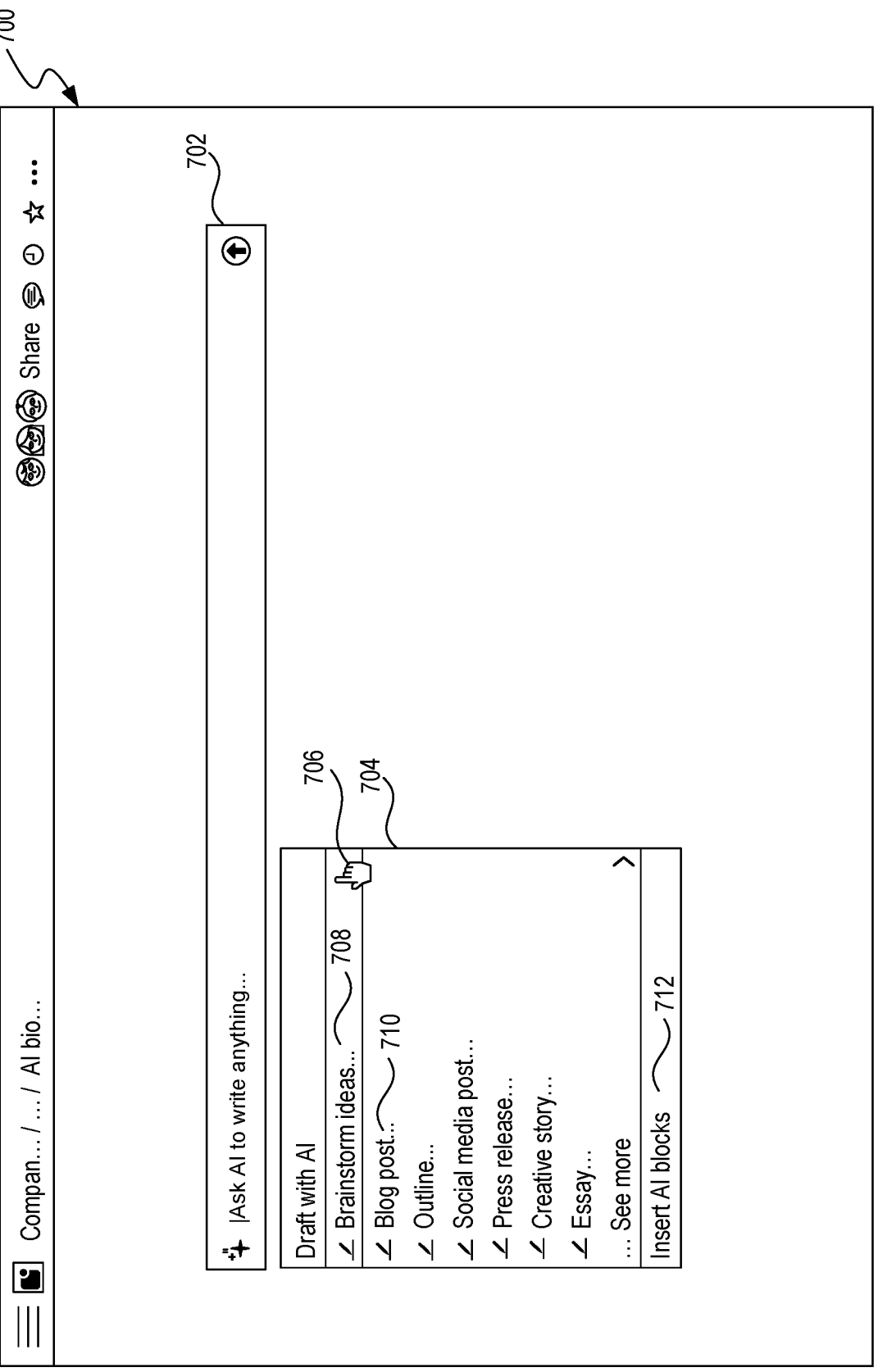
Figure 7B:
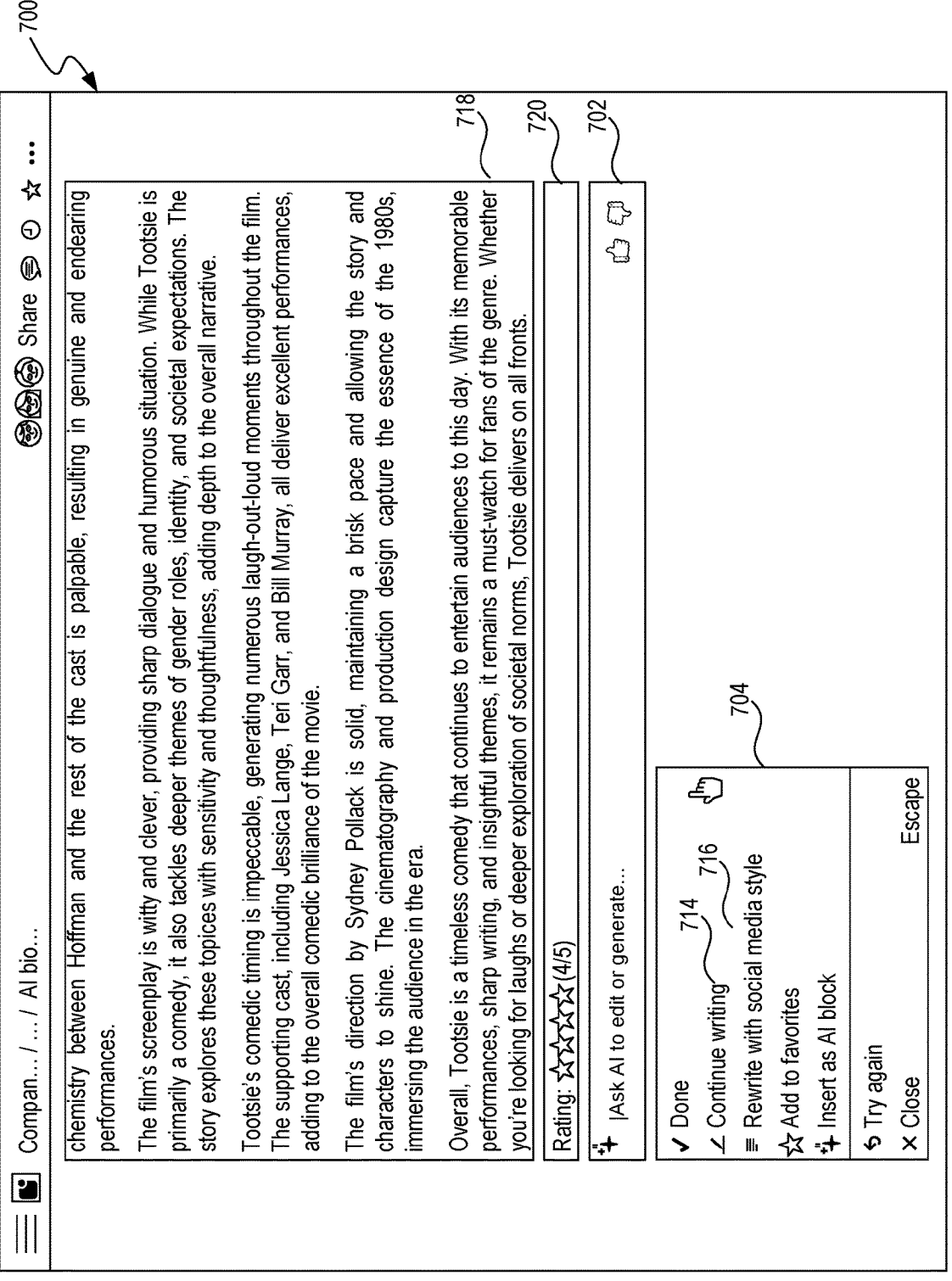

FIGS. 7A through 7C are exemplary views of a workspace page 700 for suggesting prompts. In some implementations, the page 700 corresponds to the page 300 described with respect to FIGS. 3A through 3E and/or the pages 500 and 530 described with respect to FIGS. 5A through 5E. The page 700 includes a prompt block 702 and a block 704. The prompt block 702 can correspond to the prompt block 502 in FIG. 5A. The prompt block 502 can be configured to receive text input from the user that includes instructions to perform an action by the AI system. The block 704 can be displayed concurrently with the prompt block 702. For example, actuating the control of the prompt block by an input can cause the display of the block 704.

The block 704 includes a list of suggested prompts (e.g., suggested prompts 708 and 710). Each of the prompts is associated with different instructions that can cause an AI system to generate in-page content of different types. For example, the prompt 708 can be associated with instructions that generate brainstorming ideas and the prompt 710 can be associated with instructions that generate a blog post. The suggested prompts inside the block 704 can be selectable control items. For example, by providing an input (e.g., a click when cursor 706 is on a control item associated with a respective prompt) the device can insert the selected prompt into the prompt block 702 and the AI system can be caused to create generative text based on the prompt. An example of displaying AI-generated in-page content on a page of a workspace is described, for example, with respect to FIGS. 3A and 3B.

The suggested prompts to be displayed in the block 704 can be determined by the AI system. The AI system can make the determination based on aspects of the page 700. For example, the AI system can determine the suggested prompts based on content, or lack of content, on the page 700, a location of the prompt block 702, metadata associated with the page 700, or the workspace associated with the page

700. The metadata can include information or descriptive details about the data associated with the page or the workspace. The features can include information about pages, files, documents, projects, or any other items stored or organized within the workspace.

The prompts included in the block 704 can include prompts that are chosen from predefined and preexisting prompts. The prompts can include default prompts associated with the workspace and available for the users of the workspace. The prompts can also include prompts that are created and saved by users (e.g., the present user or any user of the workspace). In some implementations, the suggested prompts include prompts created by the AI system based on the content of the page 700 and/or the relative location of the prompt on the page 700 (e.g., new prompts). The block 704 can include prompts for drafting new content (e.g., the prompts under the title "Draft with AI"). The block 704 can also include a suggestion to insert AI blocks 712 (e.g., the AI block 302 described with respect to FIGS. 3A through 3E) that include pre-defined prompts for generating text based on existing in-page text content on the page 700.

As shown in FIG. 7A, the page 700 is an empty page and does not include content other than the content inside the prompt block 702 and the block 704. The block 704 therefore includes a set of prompts that are selected by the AI system based on, for example, a relative location of the prompt block on the page 700 or metadata associated with the page 700. In FIG. 7B, the page 700 includes text content inside blocks 718 and 720 that are outside the prompt block 702. The suggested prompts (e.g., prompts 714 and 716) are generated by the AI system based on the text content in the blocks 718 and 720. The prompts in the block 704 in FIG. 7B are therefore different or partly different from the prompts included in the block 704 in FIG. 7A. For example, the suggested prompts in the block 704 on the page 700 can include prompts that are related to modifying the text included in the page. For example, the prompt 714 is for continuing to write the text in the blocks 718 and 720 and the prompt 716 is for rewriting the text in the blocks 718 and 720 in a social media style.

In FIG. 7C, the user has provided an input to select a portion of text displayed on the page 700. For example, a user can click on a text block or click and drag over a text to be selected. As shown, the text inside a block 722 is selected (e.g., indicated with a highlight). In response to a selected text, the suggested prompts in the block 704 can be based on the selected text. The prompts in the block 704 in FIG. 7C are therefore different from the prompts included in the block 704 in FIGS. 7A and 7B. In some implementations, the suggested prompts in the block 704 can be based on a combination of the selected text, as well as other text on the page 700 (e.g., text included in the block 718), metadata associated with the page and/or the workspace, and/or location of the prompt block 702.

Figure 8:
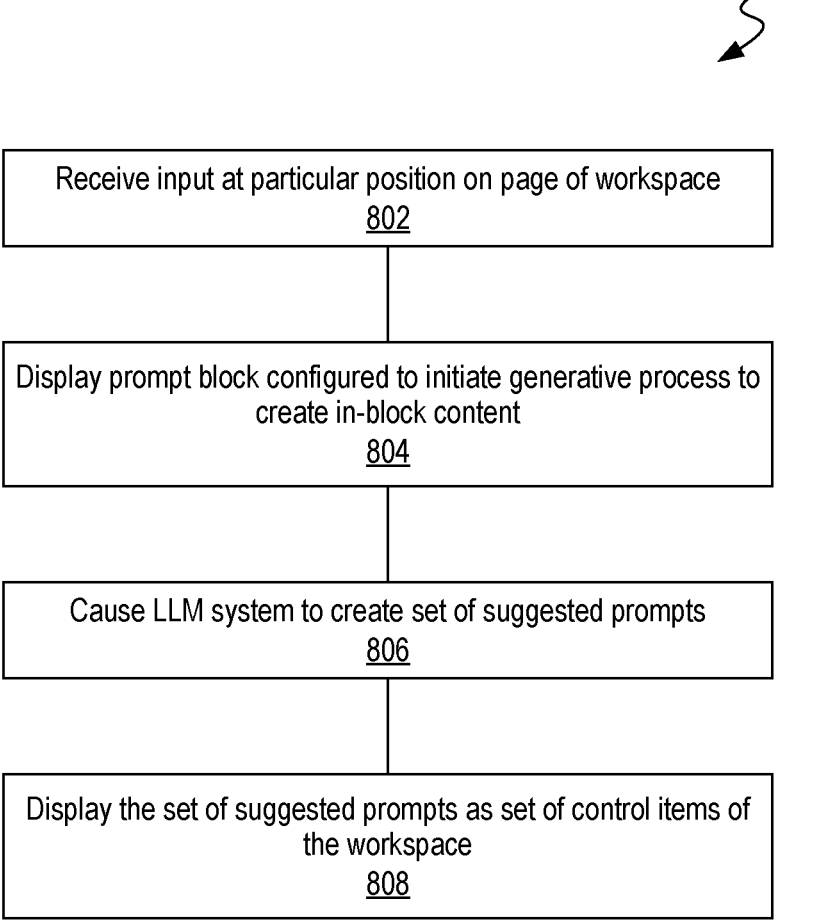
FIG. 8 is a flow diagram illustrating processes for suggesting prompts on a page of a workspace.

FIG. 8 is a flow diagram illustrating processes 800 for suggesting prompts on a page of a workspace. The processes 800 can be performed by an electronic device (e.g., the computer system 1500 described with respect to FIG. 15). The processes 800 include displaying a graphical user interface such as the page 700 described with respect to FIGS. 7A through 7C, which is associated with a workspace.

At 802, the device can receive an input at a particular position on the page of the workspace (e.g., the page 700 in FIGS. 7A through 7C). The page can include in-page text content.

At 804, in response to the input, the device can display a prompt block configured to initiate a generative process to create in-block content. For example, the user provides a click input on the page 700 when the cursor 706 is at a particular location on the page in FIG. 7A. In response to the input, the page 700 displays the prompt block 702 at that location. The page 700 in FIG. 7B includes text content in text blocks 718 and 720. The prompt block can be embedded as an in-page object on the page. For example, the prompt block 702 is an in-page object that includes a text field in FIG. 7B. The in-page text content can be located outside of the prompt block. For example, the text blocks 718 and 720 are different from the prompt block and are located outside the prompt block 702 in FIG. 7B. Alternatively, the page 700 can include text content that is not located within a block but is located outside the prompt block 702.

At 806, the device can cause the LLM to create a set of suggested prompts. For example, the page 700 in FIG. 7B includes names of suggested prompts (e.g., the prompts 714 and 716) inside the block 704. Each prompt in the set of suggested prompts can include instructions configured to create generative content of a respective type for content of the workspace when executed by the LLM system. For example, FIG. 5B illustrates a prompt (text instructions) inside the prompt block 502. The prompt in the prompt block 502 is then saved with a particular name "Minimalist, jargon-free rewrite," as described with respect to FIGS. 5A through 5B. The set of suggested prompts can be created based on at least a portion of the in-page text content and a relative location of the prompt block to the at least a portion of the in-page text content on the page.

In some implementations, the set of suggested prompts can be from a set of predefined, pre-existing prompts associated with the workspace. For example, the set of suggested prompts are default prompts associated with the workspace or prompts created and saved by users. In some implementations, the device causes the LLM system to create a new prompt based on at least a portion of the in-page text content and the relative location of the prompt block to the at least a portion of the in-page text content on the page. The set of suggested prompts can include the new prompt.

In some implementations, the set of suggested prompts is created based on all of the in-page text content included on the page. For example, the list of prompts in the block 704 in FIG. 7B can be generated based on the text content in blocks 718 and 720, and any other blocks on the page 700 other than the prompt block 702.

In some implementations, the set of suggested prompts is created based on a portion of the in-page text content that is adjacent to the prompt block. The text content can be located above, below, or next to the prompt block. For example, the list of prompts in the block 704 in FIG. 7B can be generated based on the text content in blocks 720. The block 720 is located above and adjacent to the prompt block 702.

In some implementations, the in-page text content is included inside one or more blocks configured to display text. For example, on page 700 the text content is inside the blocks 718 and 720. The set of suggested prompts can be created based on the in-page text content included inside the one or more blocks.

In some implementations, the set of suggested prompts is further created based on in-page text content on one or more pages of the workspace that are different from the page where the prompt block is located. For example, the in-page text content includes a link (e.g., the link 309 in FIG. 3A) to an online source for content. The set of suggested prompts can be further created based on content retrieved through the link.

In some implementations, the set of suggested prompts is further created based on metadata associated with the page and/or the workspace. The metadata can include information or descriptive details about the data associated with the page or the workspace (e.g., information about pages, files, documents, projects, or any other items stored or organized within the workspace).

At 808, the device can display the set of suggested prompts as a set of control items of the workspace (e.g., the prompts 714 and 716 are control items in FIG. 7B). Each of the set of control items can be selectable to input as a prompt for generating content based on the content of the workspace. The generated content is for populating the prompt block or another designated block.

In some implementations, the device can receive additional input including selecting a particular prompt from the set of suggested prompts for the prompt block. In response to the additional input, the device can cause the LLM system to create generative content of a respective type associated with the particular prompt. The device can populate the prompt block or another designated block to present the generative content of the respective type associated with the particular prompt. For example, the block 310 in FIG. 3B shows AI-generated, in-page text content that populates the block 310 on the page 300. The in-page text content is generated by the AI system based on the prompt associated with the AI block 302 in FIG. 3A.

In some implementations, the device can receive an additional input subsequent to the input that indicates a portion of the in-page text content displayed on the page of the workspace. For example, a user can provide an input to select a portion of the in-text content. In FIG. 7C, a user has provided an input to select the text in the block 722, as shown with a highlight. In response to the additional input, the device can determine that the portion of the in-page content was indicated by the additional input. The device can create the set of suggested prompts based on the portion of the in-page content that was indicated by the additional input. For example, the suggested prompts in the block 704 in FIG. 7C are suggested by the AI system based on at least the selected portion of the in-page content. The suggested prompts in the block 704 in FIG. 7C are different from the suggested prompts in the block 704.

In some implementations, the device can create the set of suggested prompts based on the portion of the in-page content that was indicated by the additional input, as well as other factors such as other text content on the page, location of the prompt block or the portion of the page that was indicated by the additional input, and/or metadata associated with the page and/or the workspace. The portion of the in-page content that was indicated by the additional input can be given a higher weight than the other one or more factors.

In some implementations, the set of suggested prompts is displayed as a drop-down list adjacent to the prompt block (e.g., the block 704 in FIG. 7B).

In some implementations, the set of suggested prompts includes prompts that cause the LLM system to create the generative content of the respective type based on the text content included on the page. For example, the prompts are associated with instructions that modify the text content included on the page. Alternatively, the set of suggested prompts includes prompts that cause the LLM system to create the generative content of the respective type regardless of the text content included on the page.

In some implementations, the set of suggested prompts is created based on the relative location of the prompt block on the page. For example, the relative location can include a relative location of the prompt block to a top edge of the page, a bottom edge of the page, or either of the side edges of the page. In an instance that the prompt block is located at the top portion of the page, the suggested prompts can include prompts that suggest generating in-page text content generally included in the top portion of the page. Such in-page text content can include text content including a title, a subtitle, an abstract, or an introductory paragraph. In an instance that the prompt block is located at a bottom portion of the page, the suggested prompts can include prompts that suggest generating in-page text content generally included in the bottom portion of the page. Such in-page text content can include text content including a summary, a conclusion paragraph, or a modification associated with the above-located text content.

In some implementations, the page does not include the in-page text content or any text content outside the prompt text (e.g., the page is an empty page). For example, the page 700 in FIG. 7A is empty in that the page 700 does not include text content outside the prompt block 702 and the block 704 including the suggested prompts. In the instance that the page does not include any text content outside the prompt block, the set of suggested prompts can be created based on the relative location of the prompt block on the page (e.g., a relative location with respect to a top edge, a bottom edge, or a side edge of the page). In some implementations, in the instance that the page does not include any text content outside the prompt block, the set of suggested prompts is created based on metadata associated with the page and/or the workspace.

Integrated Workspace

The disclosed technology includes an all-in-one integrated workspace that incorporates the described AI and prompts functionality. For example, FIGS. 9A through 9G are exemplary views of an integrated workspace that incorporates the described AI and prompts functionality. The AI-powered workspace incorporates technologies to assist users in generating, organizing, and managing content within the workspace. The AI workspace can include AI-based features and capabilities for efficient content generation and management. Such features can include, for example, automation of routine tasks and processes, personalization and contextualization of workspaces, and generation of predictions.

Figure 9A:
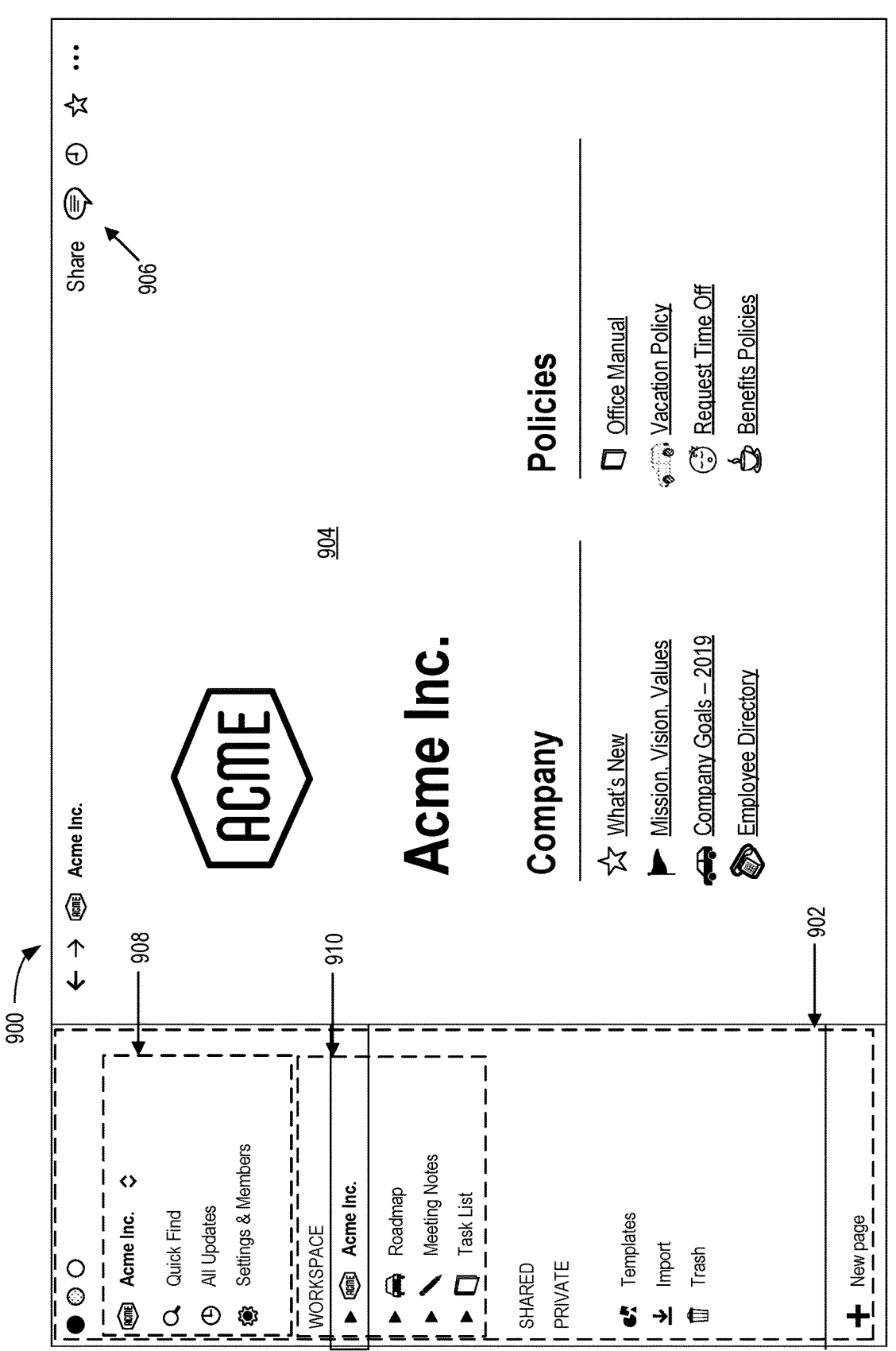
FIGS. 9A through 9G are exemplary views of an integrated workspace that incorporates the described artificial intelligence (AI) and prompts functionality.

FIG. 9A illustrates a workspace 900 as an interface that is split into two sections: a sidebar 902 and an editor 904 of a workspace page. The sidebar 902 is an expandable navigation system. The pages of the workspace 900 and databases are accessible in the sidebar 902 through, for example, clickable links. The workspace 900 can include nested pages inside each other for infinite levels of organization. The sidebar 902 can also include access links to settings, trash, and other tools. The editor 904 is a view of a workspace page that includes content. As shown, the editor 904 can include controls 906 but is otherwise an empty canvas for a user to write, plan, and brainstorm content in-page. As soon as a user starts typing in the page, the top menus fade into the background, leaving the interface with a spacious zone of focus in the page.

The tools of the sidebar 902 include a control panel 908 that contains several functions including, for example, a workspace switcher, search, updates, and settings and members. The workspace switcher 910 is clickable on the current workspace's name to switch between the workspaces that the user belongs to, create a new one, join another one, or log out. The "Quick Find" control is a search function that is clickable to open a search window, where a user can either type in what the user is looking for or quickly jump to a recently visited page. The "Updates" control is clickable to see all of a user's notifications in one place. This menu combines revisions that were made on pages that the user follows, mentions of the user across the user's workspace, and new work assignments. A red notification badge can appear here when the user has unread notifications. The "Settings & Members" control is clickable to open settings for the user's account information, workspace, payment plan, and billing information.

A team workspace, as opposed to a personal workspace, operates differently because of being configured for use with a team. A workspace defaults to keeping pages private unless explicitly configured to share with other users. On a team, any page under the workspace heading of a sidebar can be seen and most likely edited by all members of a workspace (unless otherwise specified). Sidebar organization under a workspace is also viewable by all members. The page arrangement will look the same to everyone, although individuals can toggle different pages to open or close without affecting everyone's view.

A team workspace is also referred to herein as a "teamspace," which is a dedicated area for every team within an organization or company, and can be customized on an individual basis. In one example, every workspace has at least one default teamspace, which all members will see in their sidebar. Any of the pages in default teamspaces in the sidebar 902 can be seen and shared by the other members of the workspace. The teamspaces section shows other teamspaces to which a user belongs. A teamspace name is a control that is clickable to reveal or hide its nested pages. The sidebar 902 can be kept clean by leaving any teamspaces that a user does not need to access. For example, hovering over the teamspace name and clicking the " . . . " option allows the user to then "leave" the teamspace.

Figure 9B:
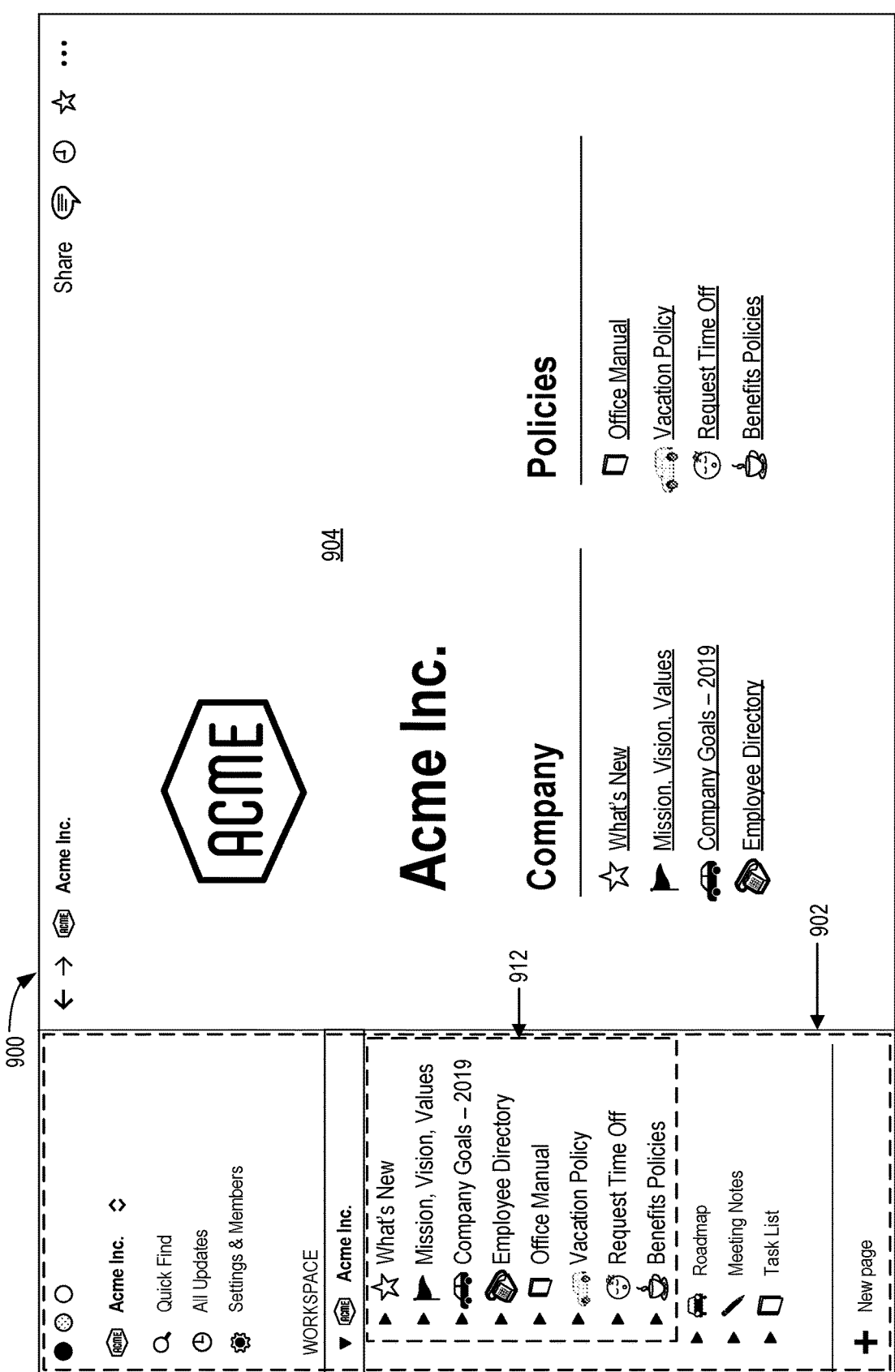

FIG. 9B illustrates the workspace 900 including nested pages 912 inside each other for infinite levels of organization. A user can open a sidebar toggle to reveal pages nested inside pages. The nested pages can be referred to as "subpages." For database pages, a user can open the toggle to see all the different views that the user created of that database. These are represented with a "•" next to them. A user can also add a new page to the workspace 900 by clicking the "+ New page" button at the bottom of the sidebar 902 to create a new page. Alternatively, the user can click any "+" button in the sidebar next to a workspace name to add a page to a particular section (not shown).

Figure 9C:
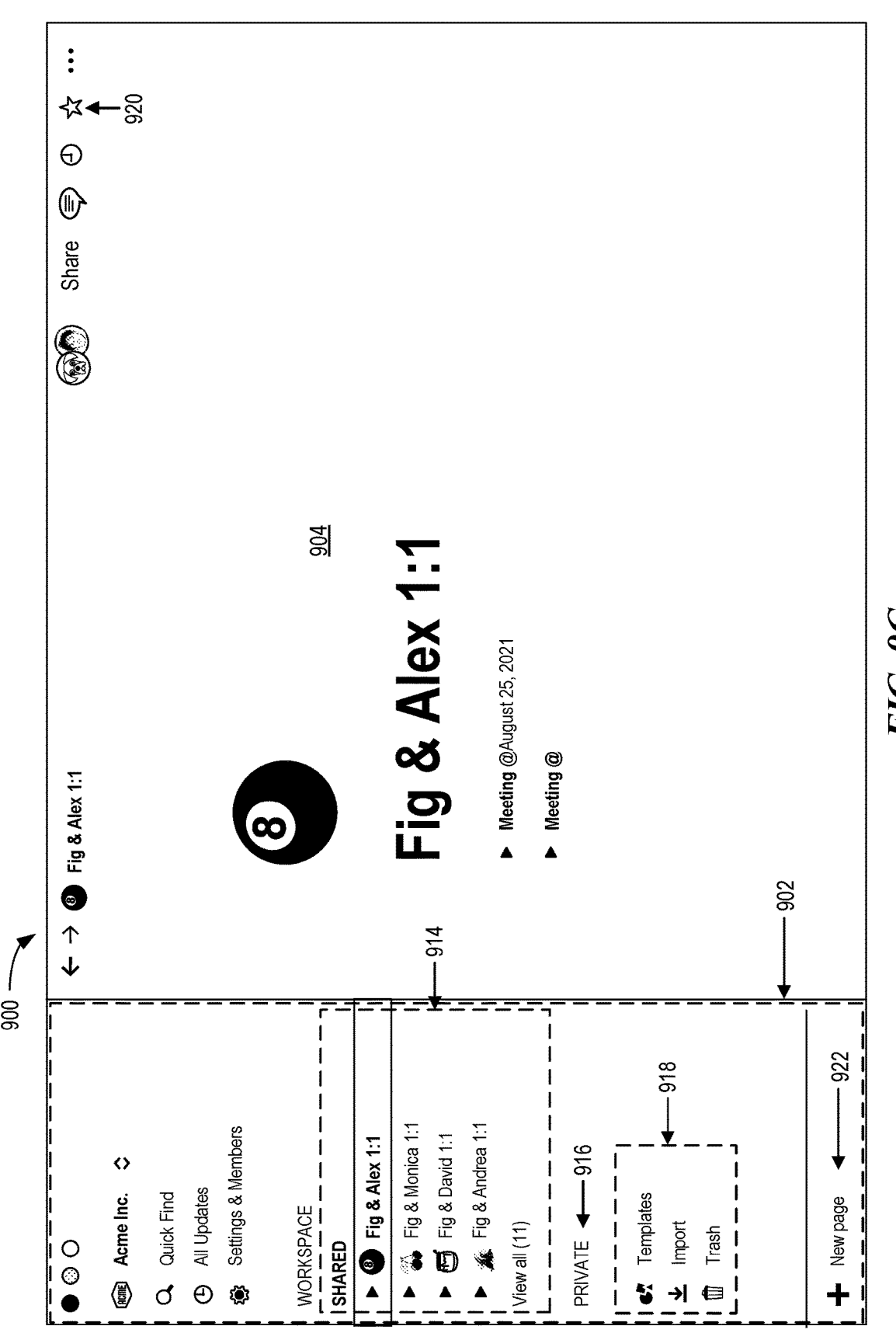

FIG. 9C illustrates the workspace 900 including an expanded shared section 914 and a collapsed private section 916. A page that the user has shared with selected individuals will appear as shared in the shared section 914. This category of pages is shown in the sidebar as soon as the user invites someone to join a private page. Other members of the workspace 900 who have not been invited cannot view these private pages. This is helpful for one-on-one meeting notes, for instance. If a user wants to remove a page from the shared section 914 without deleting it, the user can hover a cursor over the page name, click the " . . . " option, and then click "leave." The private section 916 includes the user's own pages. Anything that the user adds to the private section 916 cannot be seen or accessed by the people in the workspace 900. This is useful for a user's own tasks or notes, or for anything that the user wants to work on individually before sharing with others.

FIG. 9C additionally shows a templates, import, and trash section 918. The "Templates" control opens a template picker function, through which a user can create a new page using starter content to help accomplish any one of numerous jobs. The "Import" item allows a user to add data from a number of other apps into the workspace 900. For example, a user can readily move content over from Evernote, Trello, Asana, Word, Google Docs, Dropbox Paper, Quip, and more into the workspace. The "Trash" item contains all the pages that the user deleted. The user can drag and drop the pages into the Trash. The user can also click on the "Trash" item to search, view, and restore the deleted pages.

The workspace 900 can include a favorites section where a user can pin pages that the user seeks to access quickly. The favorites section can appear at the top of the sidebar 902. The favorites section (not shown in the sidebar) can appear when the user designates a first page as a favorite by clicking the star icon 920 on the top right of the editor 904. Clicking on the star icon 920 will pin any page to the top of the sidebar under the heading "favorites." This is particularly useful if a user wants one-click access to pages that the user visits repeatedly for a project. To remove a favorite page, the user can hover over that page in the sidebar 902, right-click (or click "•••"), and choose "Remove from Favorites."

Figure 9D:
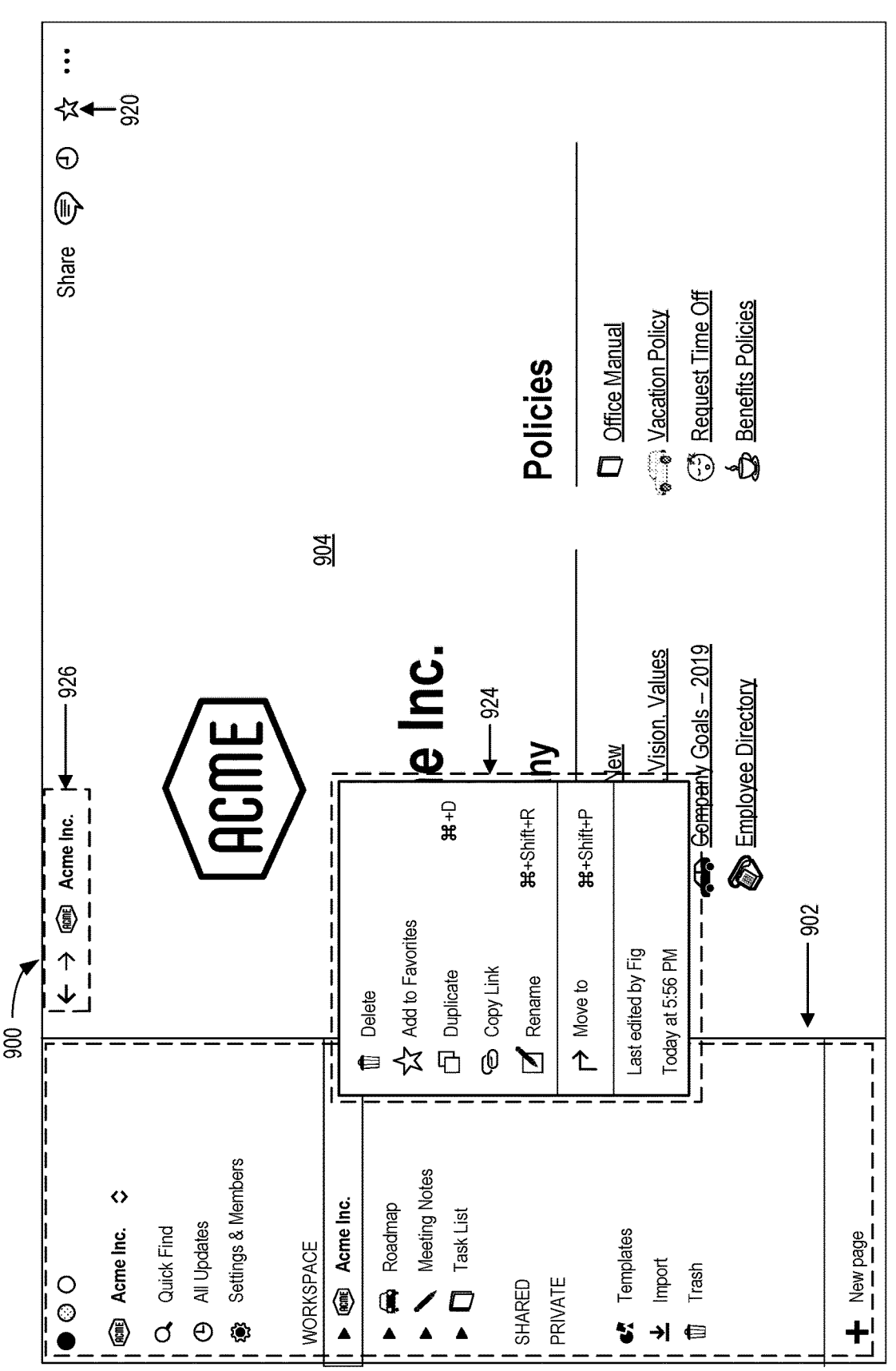

FIG. 9D illustrates the workspace 900 including hover options 924. When a user hovers over a page in the sidebar 902, the workspace 900 will show both a "+" option, to add a page nested inside the page, and a "•••" option, which opens a menu of actions that a user can apply to the page. Examples of the actions include Delete, Duplicate, Copy Link, Rename, and Move to. The workspace 900 can include editor tools 926, which includes breadcrumb navigation. This function allows users to always know where they are in respect to a page structure. A user can click on any page in the breadcrumb trail to immediately jump to it. Sometimes this will be abridged with a " . . . " notation, which is clickable to see or go to all the pages in between.

Figure 9E:
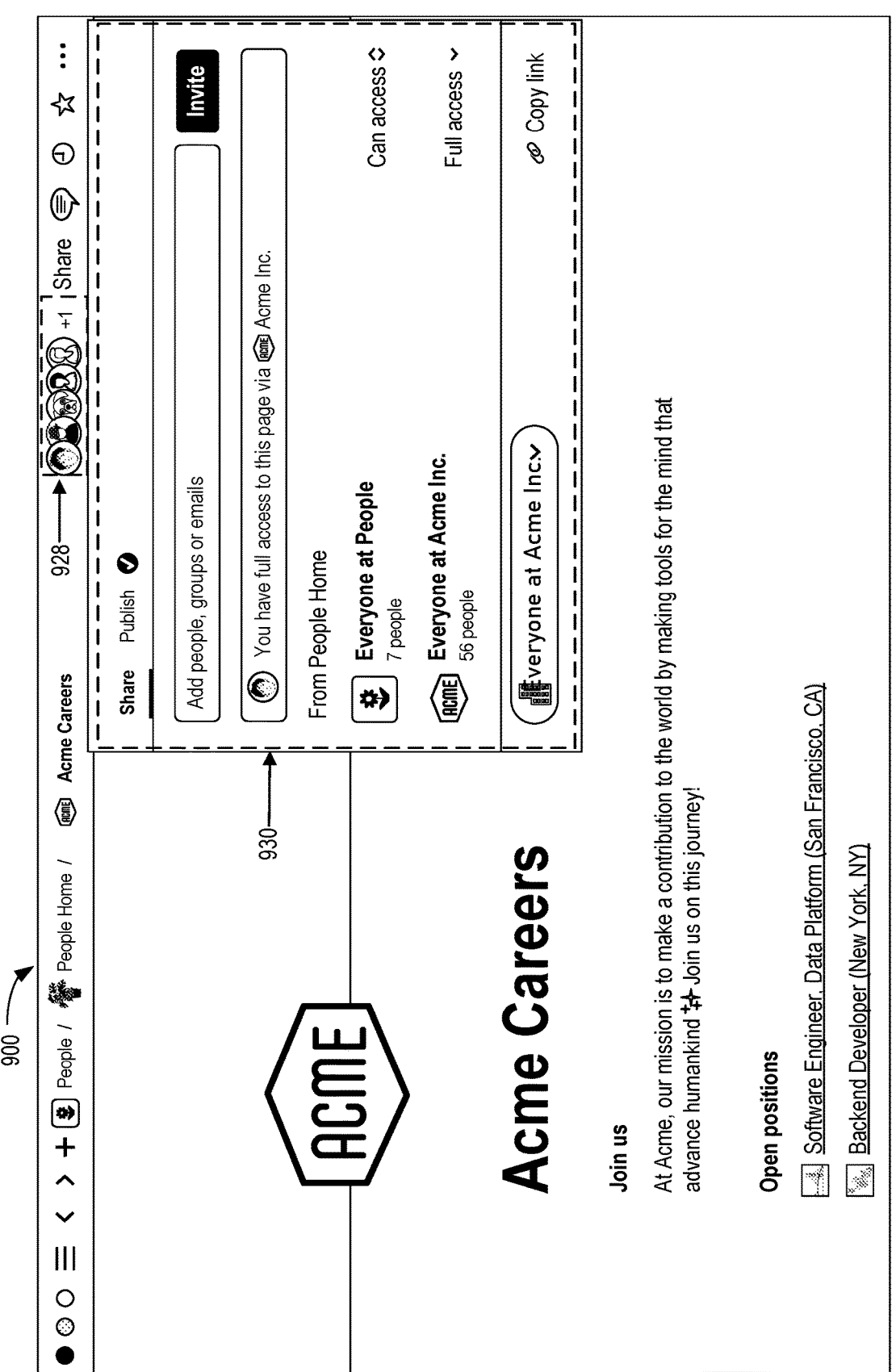

FIG. 9E illustrates collaboration functions of the workspace 900. The workspace 900 can present collaborators 928 as profile photos of everyone else who has access to the page that is open (sometimes this gets abridged to a notation like "+1" to indicate how many others are not visible). If the user hovers over any of the photos, the full list of collaborators is presented, including their names and email addresses. Grayed-out avatars represent people who are not currently viewing the page but have access to it. When a user collaborates in real-time on the same content, the user can see people's photos moving around, corresponding to the block that they are reading or editing.

FIG. 9E also shows a share menu 930. The share menu 930 includes rows, where each row in the menu represents a different person or group of people the user can share the page with. The menu shown in FIG. 9E includes a Wiki page, and the "share to web" function is turned off, so only the user and the user's teammates can see this page. "Everyone at Acme Inc." means everyone in the workspace can comment on the page. Further, the share menu 930 can include guests on the page who have been invited from outside the workspace; the guests can only view the page. Team members can have a full access to the page. The team member will be able to make edits and invite additional people. The drop-down menus on the right allow the user to set the user's level of access. "Copy link" copies the page's unique URL to the user's clipboard so that the user can share it with whomever the user wants. Still, only people with access to the page can see it. Lastly, "Invite" allows a user to add people both within and outside the user's workspace to a page using their email address.

Figure 9F:
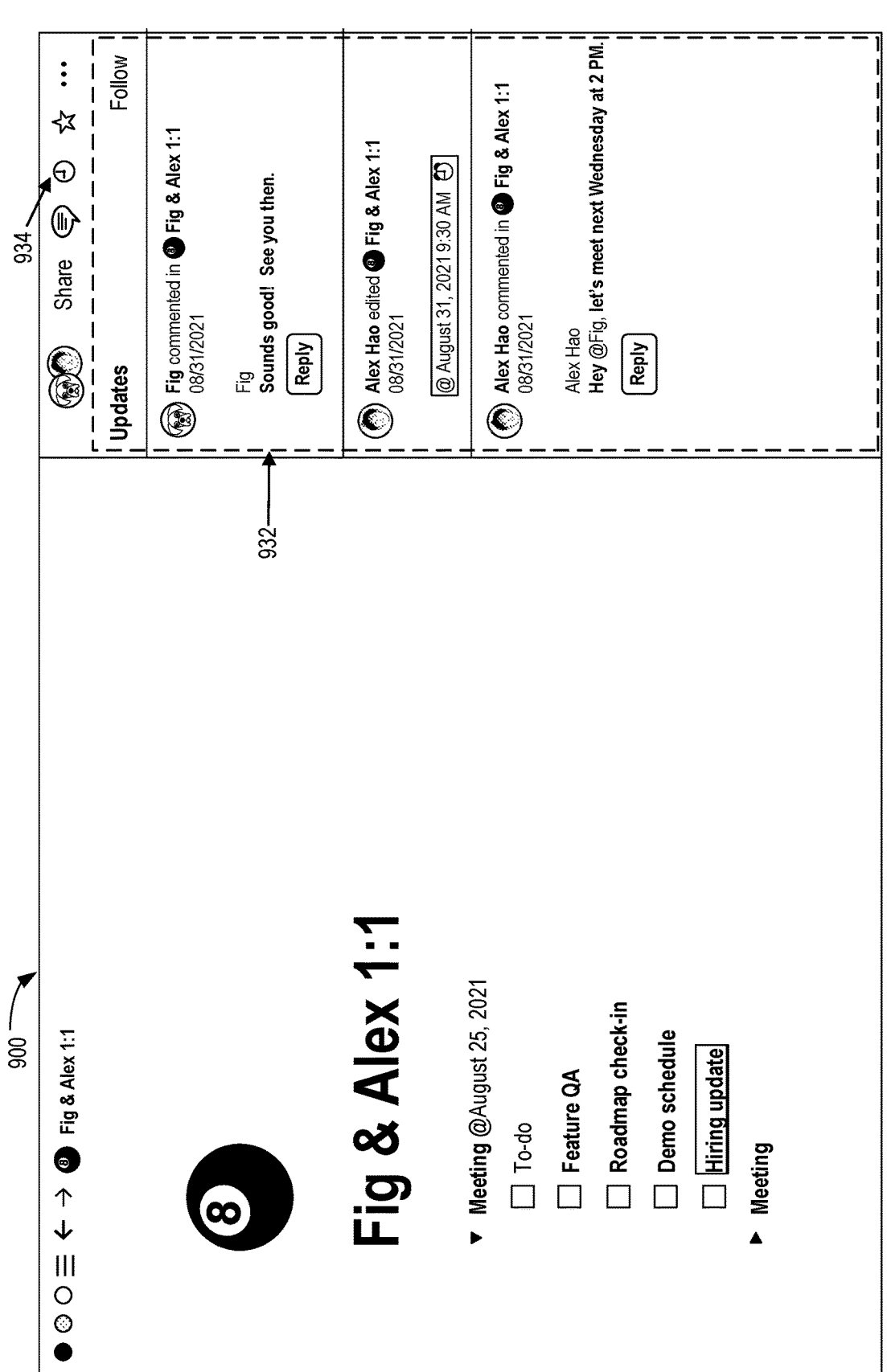

FIG. 9F illustrates an updates menu 932 of the workspace 900. The user can click the clock icon 934 to get an overview of all the revisions and comments made on the current page. The user can click the "Follow" control to keep tabs on changes made on the page. The user will see the changes aggregated across all the pages that the user follows in the updates menu 932 in the sidebar.

Figure 9G:
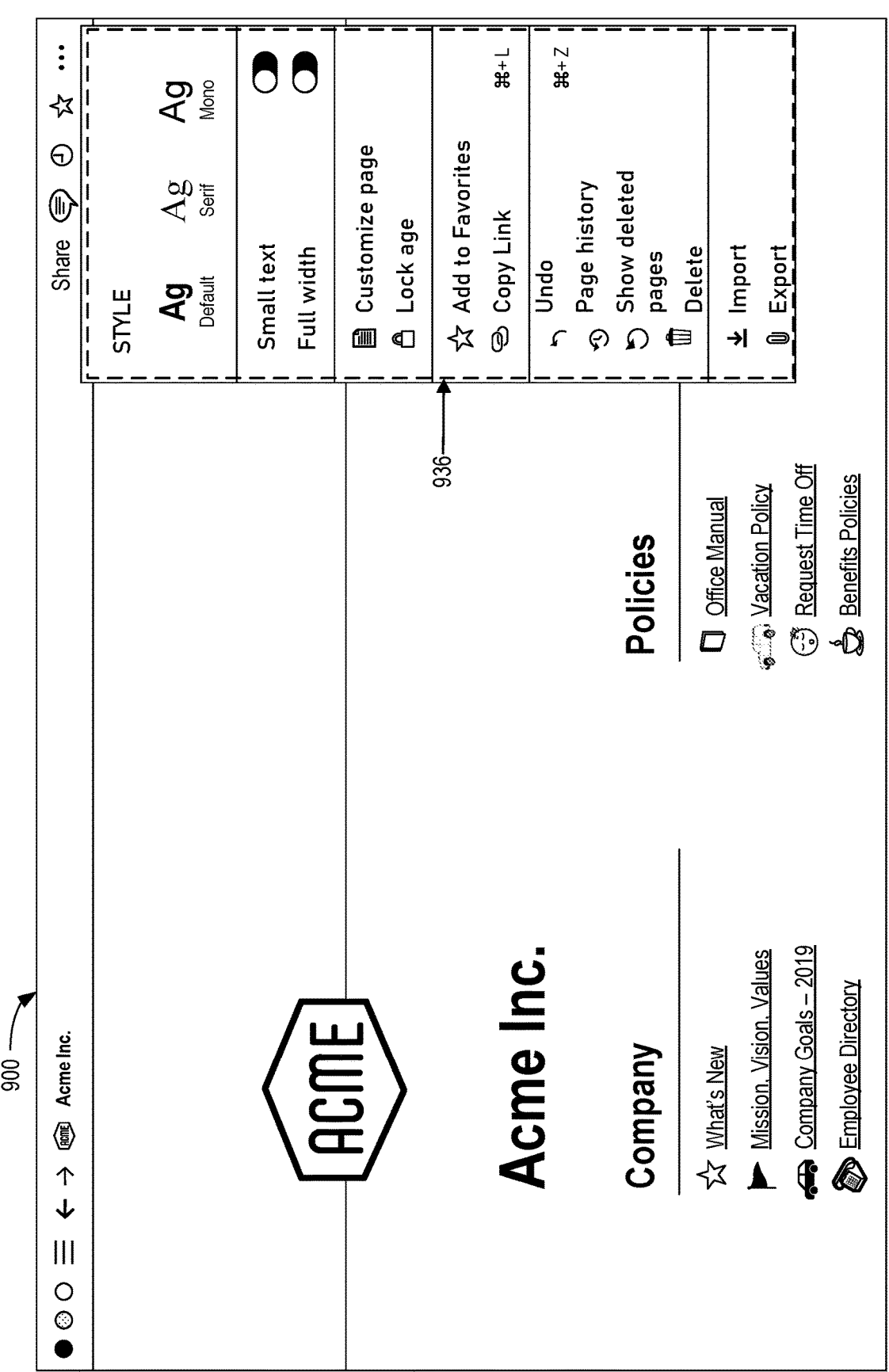

FIG. 9G illustrates a menu 936 of the workspace 900. The menu 936 contains editorial options and actions including selecting from among styles, which are alternatively selectable from different typography choices to format a page. For example, the "Small text" option can be turned on to make the type smaller throughout the page, the "Full width" option can be turned on to shrink the right and left margins of the page, and the "Customize page" option can be toggled for visibility of backlink and page comment sections.

The "Lock page" option can be turned on to prevent any edits from being made. This is useful for preventing accidental edits on pages. This option changes, however, when using the "Lock views" (not shown) option for databases. When a user turns on the lock, other users can still enter data, but they cannot change views or properties. The "Add to Favorites" option pins the page to the top of the left sidebar. The "Copy link" option copies a link to the page so that the user can share with other users who have access. The "Page history" option allows a user to view past versions of the page going back 30 days (for paid plans only). The "Show deleted pages" option opens up trash so that the user can restore or permanently remove sub-pages that have been deleted. The "Import" option can be used to add documents and data from a number of other apps (Evernote, Trello, Google Docs, etc.) to the page. The "Export" option can be used to download the page as a file to the user's computer. In one example, databases get saved as CSV files while non-database pages get saved as Markdown files. A user can also export a page or database as a PDF or an HTML file. The "Move to" option (not shown) opens a menu from which a user can choose any other workspace or page to move the current page into. The "Word count" option (not shown) is a reference for the number of words in any page. The "Last edited" option (not shown) allows a user to see who last made a change on the page and when.

Figure 10:
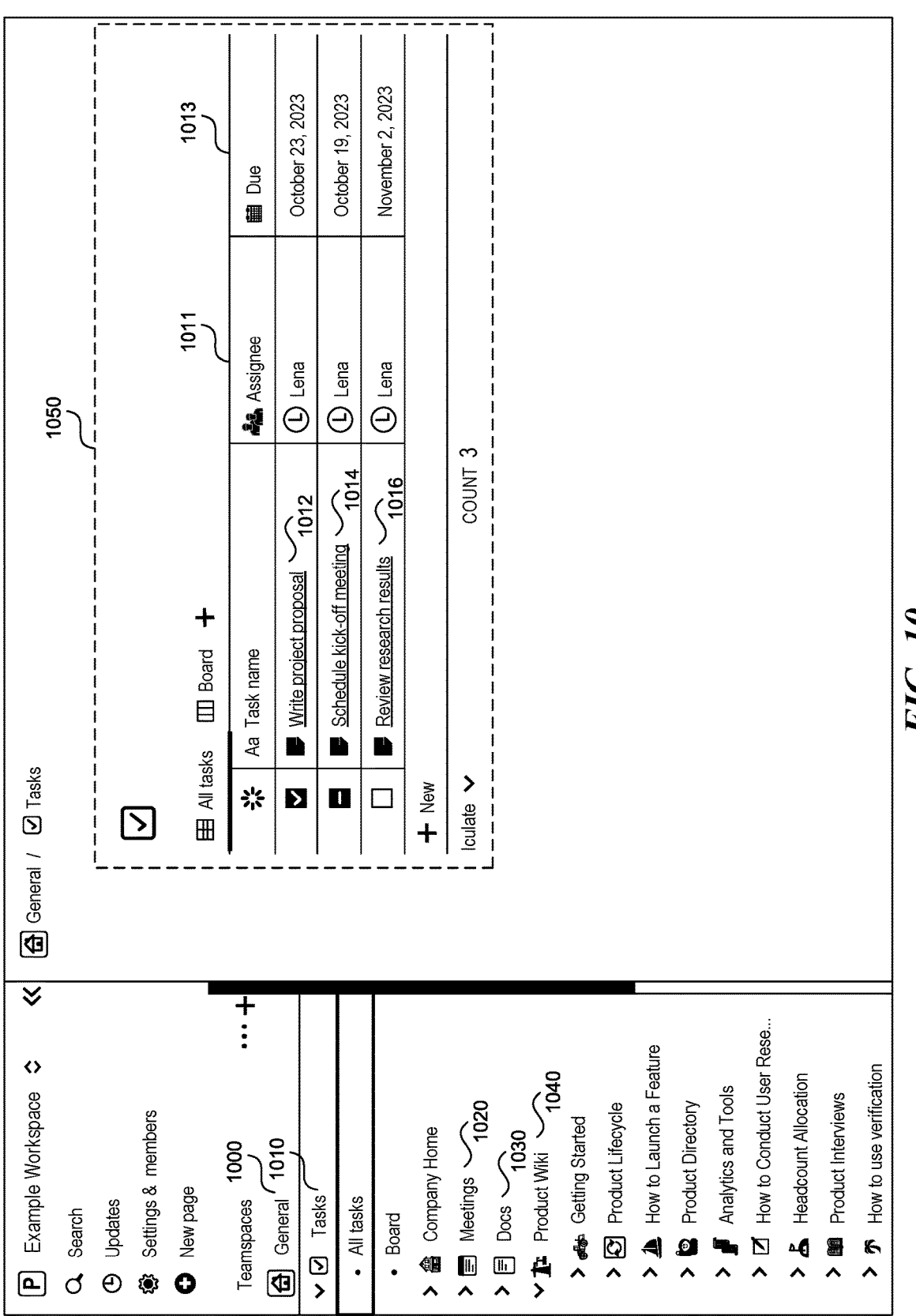
FIG. 10 shows a teamspace providing features integrated with each other and an AI.

FIG. 10 shows a teamspace providing features integrated with each other and an AI. Specifically, the teamspace 1000 includes the following features (e.g., blocks): tasks 1010, meetings 1020, documents (shown as "Docs") 1030, and wikis (shown as "Product Wiki") 1040. The features 1010, 1020, 1030, and 1040 can include software that is running on a cloud and is made available to the user through a web-based interface.

Tasks 1010 enable a user to assign and schedule various tasks 1012, 1014, 1016, as seen in columns 1011 and 1013. Meetings 1020 enable the user to view a calendar and add entries, such as meetings, to the calendar. Documents 1030 enable the user to create documents, while wikis 1040 enable the user to create wiki pages explaining features, products, or plans associated with the teamspace 1000.

When a user selects "All tasks," the system shows the sub-feature (e.g., block), e.g., the task panel 1050 presenting the various tasks 1012, 1014, and 1016 on the right side of the user interface, while still showing all the features 1010, 1020, 1030, and 1040 available to the user on the left side of the user interface. That way, the user is continuously reminded of the features 1010, 1020, 1030, and 1040 available within the teamspace 1000. Consequently, even a novice user can easily discover the functionality offered through the features 1010, 1020, 1030, and 1040 without reading extensive documentation or watching introductory videos.

Each feature 1010, 1020, 1030, and 1040 has a corresponding sub-feature through which a user can enter information. Specifically, a document 1030 feature can have a document as a sub-feature, or a wiki 1040 feature can have wiki pages as sub-features. When the user selects a sub-feature, the left side of the user interface can still show all the available features 1010, 1020, 1030, and 1040, while the right side of the user interface can show the selected sub-feature. In addition, the sub-features can reference each other using links, as explained below.

Figure 11:
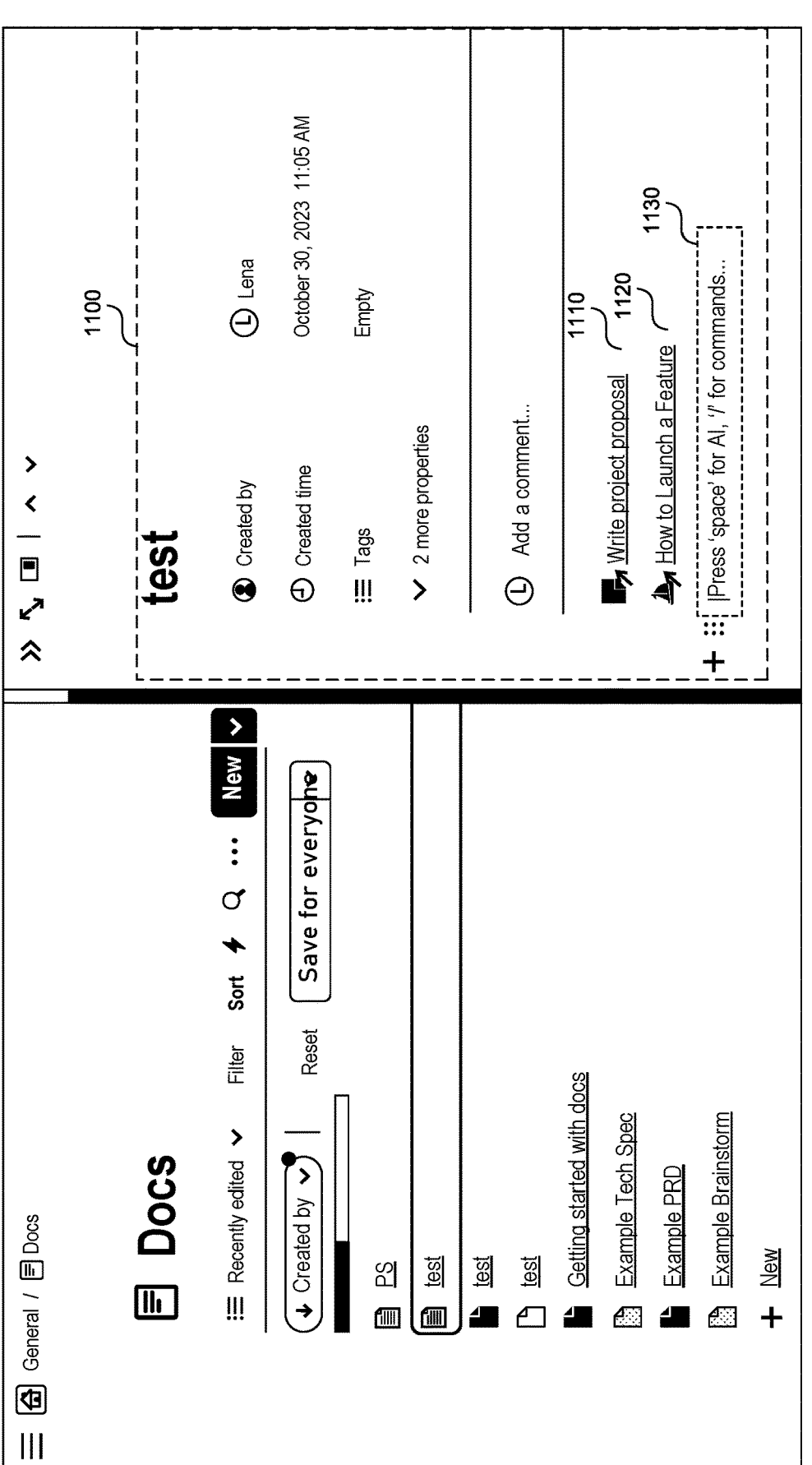
FIG. 11 shows cross-linking between sub-features and AI as well as command integration.

FIG. 11 shows cross-linking between sub-features and AI as well as command integration. For example, a sub-feature, such as a document 1100, can include links 1110 and 1120 to sub-features such as tasks and a wiki, respectively. In addition, the document 1100 can include links to some features including other documents, a calendar meeting, etc. Similarly, if the sub-feature 1100 were a task or a wiki, that sub-feature could include links to other sub-features available in the system.

The system can indicate to the user through the prompt 1130 other features available within the system, without requiring the user to read instruction manuals or watch instructional videos. The prompt 1130 indicates to the user how to interact with the system using commands. Specifically, to interact with the AI, the user can press the Space bar, while to enter a command, the user can press the "/" key.

Figure 12:
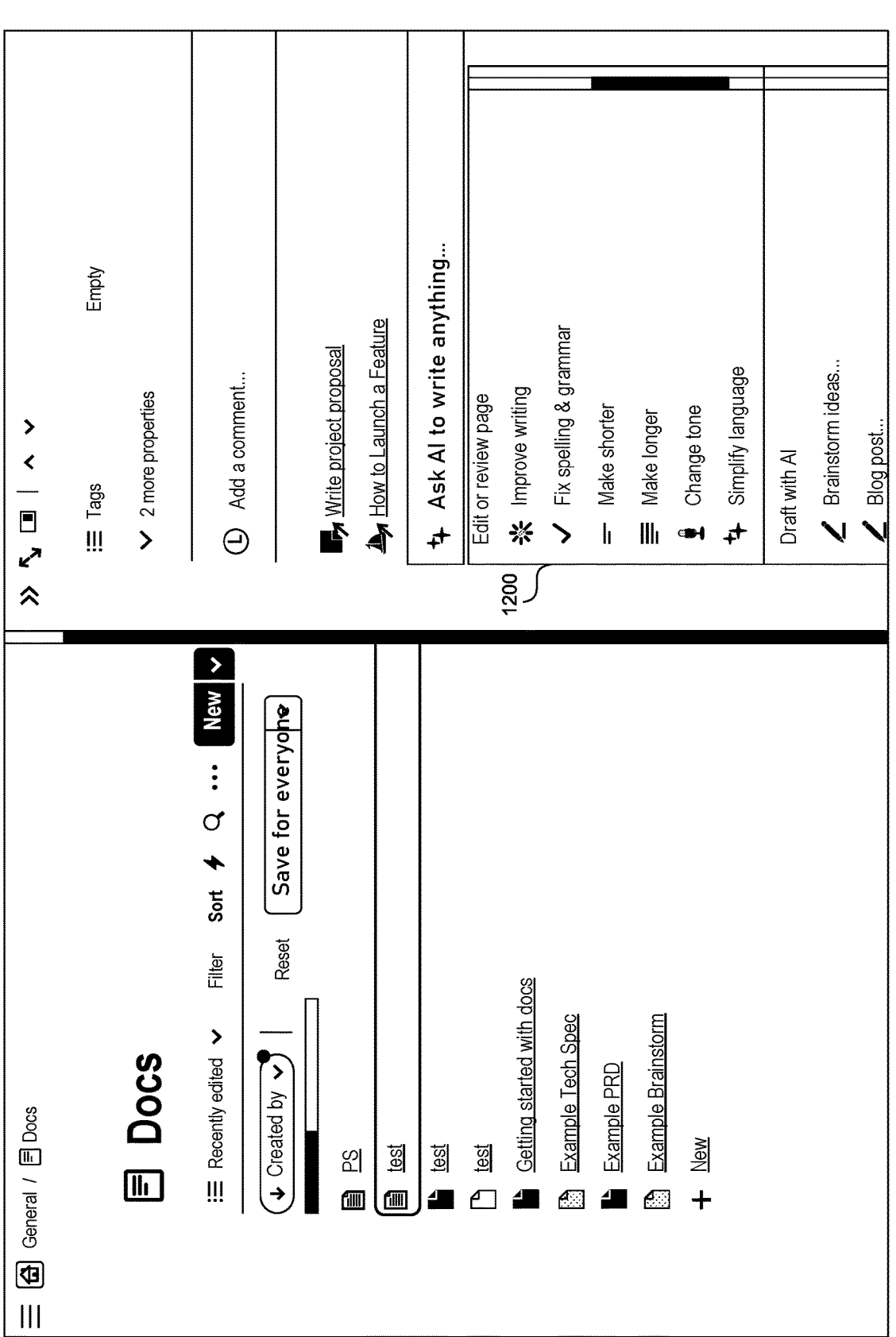
FIG. 12 shows some AI functionality available by entering an appropriate command inside a sub-feature.

FIG. 12 shows some AI functionality available by entering an appropriate command inside a sub-feature. The user can activate the AI functionality using a command issued within a sub-feature such as a document, a task, a wiki, or a calendar entry. The command can be space. Once the user enters the appropriate command, the system can present a menu 1200 of available AI functionalities including improving writing, fixing spelling and grammar, making the text shorter, making the text longer, changing the tone of the text, simplifying language, brainstorming ideas, creating a blog post, creating an outline, creating a social media post, creating a press release, writing a creative story, creating an essay, creating a poem, creating a to-do list, creating a meeting agenda, creating a pros and cons list, creating a job description, creating a sales email, creating a recruiting email, creating an action item, creating a summary, or creating a custom AI block.

Figure 13:
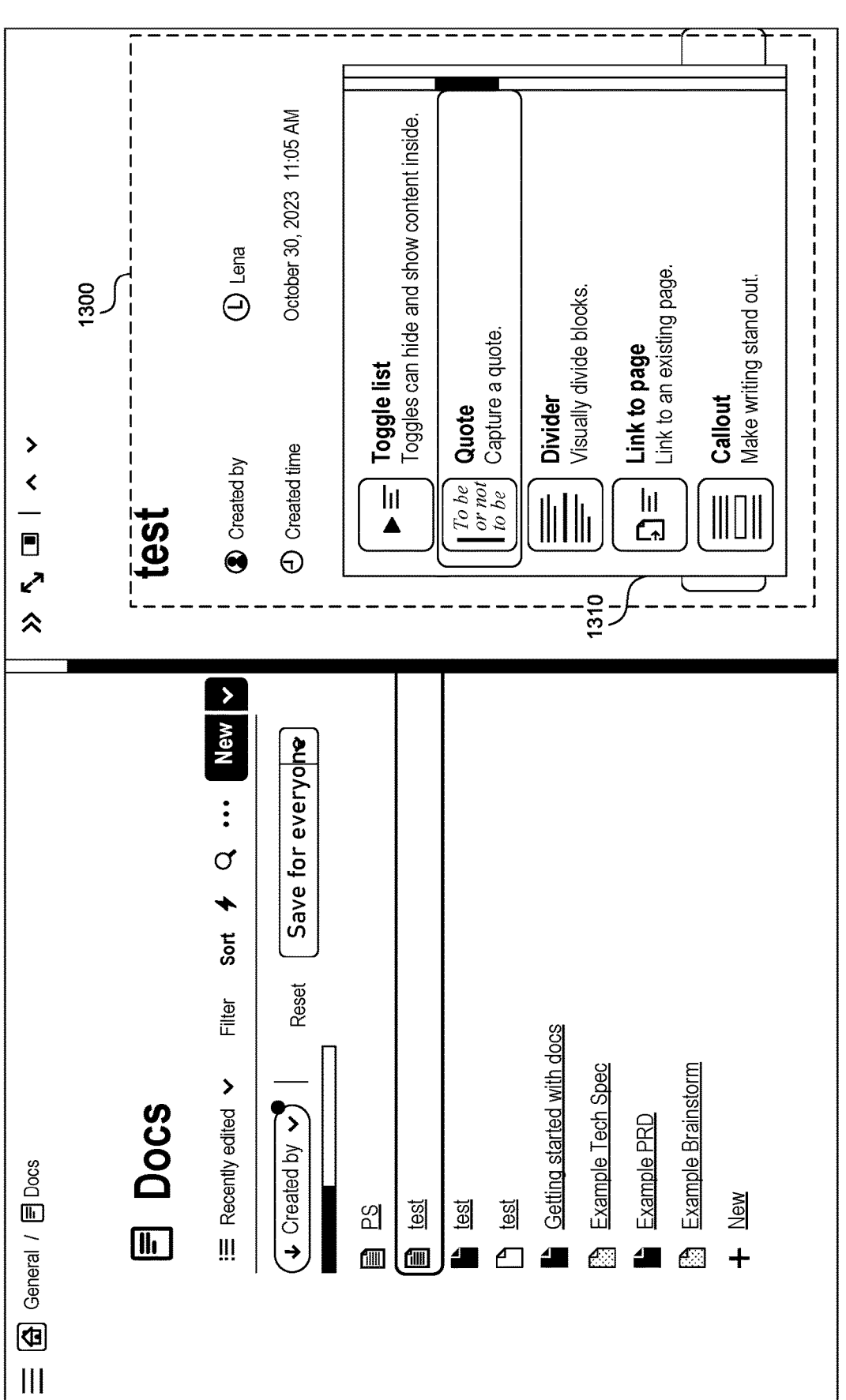
FIG. 13 shows formatting functionality available by entering an appropriate command inside a sub-feature.

FIG. 13 shows formatting functionality available by entering an appropriate command inside a sub-feature 1300. The appropriate command can include command 1310, such as the "/" symbol. The formatting functionality can include creating a toggle list that can hide and expand content by selecting an indicator such as an arrow, creating a quote, creating a divider, creating a link to a sub-feature 1300, or creating a callout. The link to the sub-feature 1300 can be copied into another sub-feature, thus creating a link between the other sub-feature and the current sub-feature 1300. In addition, links can be created to a portion of the sub-feature and shared among various sub-features. The links to sub-features can be shared across sub-features in the same workspace, or across sub-features in different workspaces.

FIG. 14 is a flow diagram illustrating processes 1400 of an integrated workspace including the described AI and prompts functionality. A system can include a non-transitory, computer-readable storage medium including instructions that, when executed by at least one data processor of the system, cause the system to perform the processes 1400 of the integrated workspace.

At 1402, a block is inserted on a page of a workspace. The block is an in-page object on the page and has dimensions that define a block area occupying a corresponding page area on the page of the workspace. The workspace includes a sidebar section and an editor section presented on an interface. The editor section presents a canvas of a current page in which the block is inserted. The sidebar section includes links to workspaces, databases, pages, and/or tools. Examples of the tools include a workspace switcher tool to switch between workspaces having a common member. The switcher tool can include clickable links to respective workspaces. A search tool enables querying for content on a page or jumping to another page of the workspace. An updates tool can present notifications including revisions to pages followed by a user or mentions of the user across a workspace. A settings tool can provide access to account information of the user.

At 1404, the workspace is caused to initiate a generative function to create in-block content of a particular type (e.g., summary, list of action items). In one example, the generative function is initiated in response to user input proximate to the block and/or elsewhere on the page of the workspace. For example, the sidebar section can include links to multiple pages and nested pages of the workspace. The multiple pages and nested pages are organized hierarchically such that a nested page is a sub-page of another page of the multiple pages.

At 1406, at least some of the in-page content is selected as input for the generative function. The in-page content is presented on the page of the workspace and is located outside of the block. The selection can be determined based on a location of the block and the particular type of in-block content. In one example, the in-page content can be selected manually as a portion of in-page content.

The page including the in-page content can correspond to a shared page and/or a private page. In particular, the sidebar section can include a shared section having links to pages that are shared among users of workspaces. The linked pages can include pages shared by other users or pages shared with others. The selection of the in-page content is viewable by all members of the team in a shared workspace (e.g., teamspace). The sidebar section can also include a private section to private pages where the user is the only member. In another example, the in-page content is based on a template selected using the template picker function. In another example, the page including the in-page content includes data imported using the import function. In yet another example, the page including the in-page content is pinned to the favorites section of the workspace. In another example, the in-page content and block are included on the same or different nested pages or other pages at a higher level of the hierarchy.

At 1408, a generative AI system (e.g., LLM) can be caused to create the generative content of the particular type based on input including the selection of the in-page content and a location of the block on the page. In one example, the input to the generative AI system includes content of another workspace, which includes the selection of the in-page content. In one example, the workspace switcher tool can be used to navigate to another workspace that includes the selection of the in-page content, which is different from the workspace including the block.

At 1410, the system can populate the block area to present the generative content as generative in-block content. The block area can be dynamically expanded to fit the generative in-block content.

The system can receive a predetermined command, such as "/". Upon receiving the predetermined command, the system can provide a menu of multiple block types in a user interface, such as a tab, a toggle list, a quote, a bulleted list, a callout, a link to a page, a heading, a table, a numbered list, etc. The system can receive a selection of a block type among the multiple block types, such as a "a tab." The system can insert the block on the page presented in the editor section of the workspace, where the block is of the selected block type. For example, if the block is of the type "tab", the system can insert two or more tabs on the page.

The generative functions of the workspace can include saving and sharing prompts. For example, the system can respond to user input by initiating a generative process associated with a prompt block to create in-block content. The prompt block is embedded on the page of the workspace, and the user input can include prompt text configured to cause a generative AI system to create the in-block content. The system can cause the generative AI system to create, based on the prompt text, a descriptive label that is descriptive of the prompt text. The system can save the prompt text and the descriptive label as a reusable prompt. As such, the reusable prompt is identifiable based on the descriptive label and is accessible from pages of the workspace. The generative process to create in-block content based on the reusable prompt is configured to be initiated on a respective page of the pages of the workspace in response to a user input. The system can share the reusable prompt by generating a link (e.g., URL) that is configured to be copied and shared to users within or outside the workspace. Hence, the link allows other users to access the reusable prompt as a prompt to the generative AI system. The reusable prompt can be made accessible from other workspaces or other pages to perform a generative process based on in-page content in a respective workspace and/or page. The reusable prompt can be made accessible by all members of a team or kept private across pages of a private workspace.

The generative functions of the workspace can also include generating suggested prompts. The system can cause display of a prompt block embedded as an in-page object on a page of the workspace. The page includes in-page text content located outside of the prompt block, and the prompt block is configured to initiate a generative process to create in-block content. In one example, at least a portion of the in-page text content includes content from a template selected using the template picker function. In another example, at least a portion of the in-page text content includes data imported using the import function. The system can cause a generative AI system to create suggested prompts that each include instructions configured to create, when executed by the generative AI system, generative content of a respective type based on existing content of the workspace. The suggested prompts are created based on at least a portion of the in-page text content and a location of the prompt block relative to at least a portion of the in-page text content. The system can cause display of the suggested prompts as a set of control items of the workspace. The control items are each selectable as a prompt for generating content based on existing content of the workspace, and the generated content populates the prompt block or a block other than the prompt block.

Computer System

Figure 15:
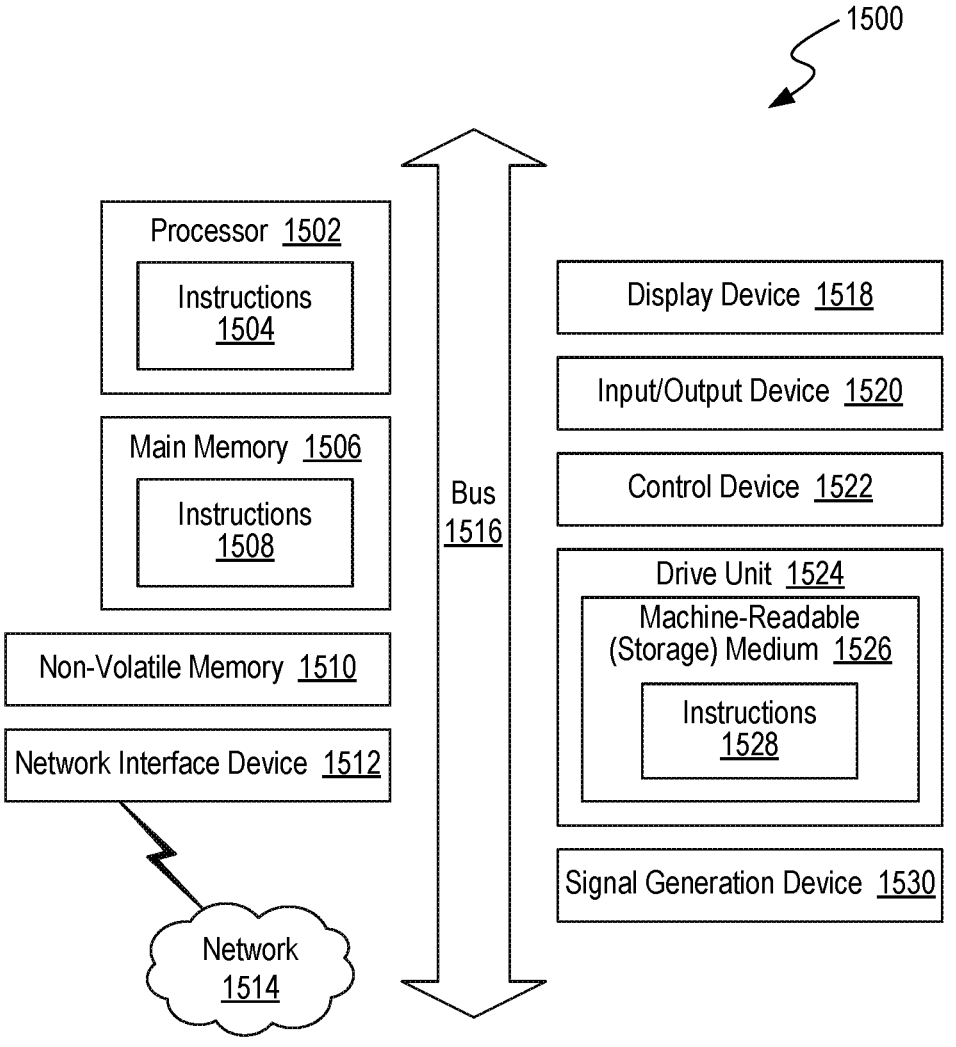
FIG. 15 is a block diagram that illustrates an example of a computer system in which at least some operations described herein can be implemented.

FIG. 15 is a block diagram that illustrates an example of a computer system 1500 in which at least some processes described herein can be implemented (e.g., processes 400, 600, and 800 described respectively with respect to FIGS. 4, 6, and 8). As shown, the computer system 1500 can include: one or more processors 1502, main memory 1506, non-volatile memory 1510, a network interface device 1512, a display device 1518, an input/output device 1520, a control device 1522 (e.g., keyboard and pointing device), a drive unit 1524 that includes a machine-readable (storage) medium 1526, and a signal generation device 1530 that are communicatively connected to a bus 1516. The bus 1516 represents one or more physical buses and/or point-to-point connections that are connected by appropriate bridges, adapters, or controllers. Various common components (e.g., cache memory) are omitted from FIG. 15 for brevity. Instead, the computer system 1500 is intended to illustrate a hardware device on which components illustrated or described relative to the examples of the figures and any other components described in this specification can be implemented.

The computer system 1500 can take any suitable physical form. For example, the computer system 1500 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1500. In some implementations, the computer system 1500 can be an embedded computer system, a system-on-chip (SOC), a single-board computer (SBC) system, or a distributed system such as a mesh of computer systems or include one or more cloud components in one or more networks. Where appropriate, one or more computer systems 1500 can perform operations in real-time, near real-time, or in batch mode.

The network interface device 1512 enables the computer system 1500 to mediate data in a network 1514 with an entity that is external to the computer system 1500 through any communication protocol supported by the computer system 1500 and the external entity. Examples of the network interface device 1512 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1506, non-volatile memory 1510, machine-readable medium 1526) can be local, remote, or distributed. Although shown as a single medium, the machine-readable medium 1526 can include multiple media (e.g., a centralized/distributed database and/or associated caches and servers) that store one or more sets of instructions 1528. The machine-readable medium 1526 can include any medium that is capable of storing, encoding, or carrying a set of instructions for execution by the computer system 1500. The machine-readable medium 1526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in computing device(s). When read and executed by the processor 1502, the instruction(s) cause the computer system 1500 to perform operations to execute elements involving the various aspects of the disclosure.

The computer system 1500 can be configured to access a remote language model server (e.g., a cloud-based language model) via the API 128 described with respect to FIG. 1 or the network interface device 1512. For example, the computer system 1500 can communicate with a remote generative AI system to send instructions to and receive content from the generative AI system. As described with respect to FIG. 2, the generative AI system can be an LLM system based on ChatGPT or GPT-3 language model.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for storing prompt blocks for reuse on pages of a workspace including multiple pages, the method comprising:

instantiating a first block of a block data model, the first block corresponding to a prompt block added as an object on a first page of the workspace and being configured to initiate a generative process to create in-block content on the first page, wherein the first page is saved as a second block of a type different than the prompt block, the first block and the second block being stored at a server that hosts the workspace;

wherein the first block has a first set of attributes including a first access permission attribute defining access permission for the first page, wherein the first block is instantiated in response to a first input including a string of text that is indicative of instructions that cause a generative artificial intelligence (AI) system to create the in-block content on the first page, the in-block content being conditioned on content included on the first page outside of the first block;

causing the generative AI system to create, based on the string of text, a name that is descriptive of the instructions, and storing, on the server, a particular prompt block having a second set of attributes including the name that is descriptive of the instructions in association with the string of text wherein the particular prompt block corresponds to a third block that is identifiable based on the name descriptive of the instructions and is accessible from other pages of the workspace, wherein a generative process to create in-block content based on the particular prompt is configured to be initiated on a respective page of the multiple pages of the workspace by a user input on the respective page;

determining that the third block is a child of the second block based on the first block being embedded as an object of the second block;

in response to determining that the third block is a child of the second block, causing the second set of attributes to automatically inherit the first access permission attribute from the first set of attributes of the second block;

in response to receiving a second input at a second page, causing the second page to display a list of names for respective prompt blocks in a drop-down menu, each name being descriptive of an instruction to cause the generative AI system to create in-block content on the second page, wherein the name of the particular prompt block is included in the list of prompts based on a determination that the first access permission is included in a third set of attributes of the second page; and in response to receiving a third input selecting the name of the particular prompt block included in the list of names of respective prompt blocks, initiating a process to add a new prompt block embedded as an object in the second page and to generate in-block content in accordance with the instructions of the particular prompt block,

wherein the in-block content generated on the second page is conditioned on content on the second page, outside of the new prompt block.

2. The method of claim 1, further comprising:

in response to a third input, generating a Uniform Resource Locator (URL) linked to an online source including the particular prompt, wherein the URL is configured to be copied and shared to users outside the workspace, and wherein the URL allows the users outside the workspace to access the particular prompt.

3. The method of claim 1, further comprising:

in response to a third input, generating a Uniform Resource Locator (URL) linked to an online source including the particular prompt, wherein the URL is configured to be shared with a group of users.

4. The method of claim 1, further comprising:

receiving a third input on the prompt block to perform a modification of the string of text, and in response to detecting the modification on the string of text, automatically saving the particular prompt to incorporate the modifications on the string of text.

5. The method of claim 1, further comprising:

subsequent to saving the particular prompt, displaying a drop-down menu including a list of prompts categorized as commonly used prompts, and displaying the particular prompt in the list of prompts.

6. The method of claim 1, wherein the particular prompt is configured to be accesses by users associated with the workspace.

7. The method of claim 1, further comprising:

receiving an input to modify the name descriptive of the string of text created by the generative AI system, and saving the string of text and the modified name as the particular prompt.

8. The method of claim 1, further comprising:

in response to the second input on the prompt block, displaying a drop-down menu including a predefined list of control items to perform actions associated with the prompt block, and receiving a selection input to select a control item to perform an action associated with saving the string of text as a prompt from the list of actions.

9. The method of claim 1, further comprising:

causing the generative AI system to create the in-block content based on the particular prompt, and displaying the in-block content on the page of the workspace.

10. The method of claim 1, further comprising:

causing the generative AI system to create the in-block content based on the particular prompt and in-page content that is on the page outside the prompt block, and displaying the in-block content on the page of the workspace.

11. The method of claim 1, wherein the generative AI system creates the name descriptive of the string of text using a large language model (LLM).

12. The method of claim 1, wherein the string of text including the instructions operates as a prompt to cause the generative AI system to create the in-block content.

13. The method of claim 1,
wherein the first input includes a first portion that actuates
a control of a text field on the first block, and
wherein the first input includes a second portion including
the string of text provided on the text field.

14. The method of claim 1,
subsequent to saving the particular prompt,
displaying a drop-down menu including a list of
prompts including the particular prompt, and
in response to an input of moving a cursor on the
particular prompt, displaying a description of func-
tions associated with the particular prompt, wherein
the description is created by the generative AI sys-
tem.

15. A computer-implemented method for storing prompts
blocks for reuse on pages of a workspace including multiple
pages, the method comprising:
instantiating a first block of a block data model, the first
block corresponding to a prompt block added as an
object on a first page of the workspace and being
configured to initiate a generative process to create
in-block content on the first page,
wherein the first page is saved as a second block of a
type different than the prompt block, the first block
and the second block being stored at a server that
hosts the workspace;
wherein the first block has a first set of attributes
including a first access permission attribute defining
access permission for the first page;
wherein the first block is instantiated in response to a
first input including a string of text,
that is indicative of instructions that cause a generative
artificial intelligence (AI) system to create the in-
block content on the first page the in-block content
being conditioned on content included on the first
page outside of the first block;
storing, on the server, the string of text as a particular
prompt having a second set of attributes,
wherein the particular prompt is accessible from
the multiple pages of the workspace, and
wherein the particular prompt is configured to be
shared with users of the workspace;
wherein the particular prompt block corresponds to a
third block that is accessible from other pages of the
workspace,
wherein a generative process to create in-block content
based on the particular prompt is configured to be
initiated on a respective page of the multiple pages of
the workspace by a user input on the respective page;
determining that the third block is a child of the second
block based on the first block being embedded as an
object of the second block;
in response to determining that the third block is a child
of the second block, causing the second set of
attributes to automatically inherit the first access
permission attribute from the first set of attributes of
the second block;
in response to receiving a second input at a second
page, causing the second page to display a list of
names for respective prompt blocks in a drop-down
menu, each name being descriptive of an instruction
to cause the generative AI system to create in-block
content on the second page,
wherein the particular prompt block is included in
the list of prompts based on a determination that
the first access permission is included in a third set
of attributes of the second page; and in response to receiving a third input selecting the
particular prompt block included in the list of names
of respective prompt blocks, initiating a process to
add a new prompt block embedded as an object in the
second page and to generate in-block content in
accordance with the instructions of the particular
prompt block,
wherein the in-block content generated on the second
page is conditioned on content on the second page,
outside of the new prompt block.

16. The computer-implemented method of claim 15, fur-
ther comprising:
in response to a third input,
generating a Uniform Resource Locator (URL) linked
to an online source including the particular prompt,
wherein the URL is configured to be copied and
shared to users outside the workspace, and
wherein the URL allows the users outside the work-
space to access the particular prompt.

17. The computer-implemented method of claim 15, fur-
ther comprising:
subsequent to saving the particular prompt,
displaying a drop-down menu including a list of
prompts categorized as commonly used prompts, and
displaying the particular prompt in the list of prompts.

18. The computer-implemented method of claim 15,
wherein the particular prompt is configured to be accesses
by users associated with the workspace.

19. An electronic device for storing prompt blocks for
reuse on pages of a workspace including multiple pages,
comprising:
at least one hardware processor; and
at least one non-transitory memory storing instructions,
which, when executed by the at least one hardware
processor, cause the electronic device to:
instantiate a first block of a block data model, the first
block corresponding to a prompt block added as an
object on a first page of the workspace and being
configured to initiate a generative process to create
in-block content on the first page,
wherein the first page is saved as a second block of a
type different than the prompt block, the first block
and the second block being stored at a server that
hosts the workspace;
wherein the first block has a first set of attributes
including a first access permission attribute defining
access permission for the first page,
wherein the first block is instantiated in response to
a first input including a string of text
indicative of instructions that cause a generative arti-
ficial intelligence (AI) system to create the in-block
content on the first page, the in-block content being
conditioned on content included on the first page
outside of the first block;
cause the generative AI system to create, based on
the string of text, a name that is descriptive of the
instructions, and
storing, on the server, a particular prompt block
having a second set of attributes including the
name that is descriptive of the instructions in
association with the string of text,
wherein the particular prompt block corresponds
to a third block that is identifiable based on the
name descriptive of the instructions and is
accessible from other pages of the workspace,
and wherein a generative process to create in-block content based on the particular prompt is configured to be initiated on a respective page of the multiple pages of the workspace by a user input on the respective page determining that the third block is a child of the second block based on the first block being embedded as an object of the second block;

in response to determining that the third block is a child of the second block, causing the second set of attributes to automatically inherit the first access permission attribute from the first set of attributes of the second block;

in response to receiving a third input selecting the name of the particular prompt block included in the list of names of respective prompt blocks, initiating a process to add a new prompt block embedded as an object in the second page and to generate in-block content in accordance with the instructions of the particular prompt block, wherein the in-block content generated on the second page is conditioned on content on the second page, outside of the new prompt block.

\*    \*    \*    \*    \*